(12) United States Patent
Inoue et al.

(10) Patent No.: US 12,420,806 B2
(45) Date of Patent: Sep. 23, 2025

(54) DETERMINATION SYSTEM

(71) Applicant: Panasonic Intellectual Property Management Co., Ltd., Osaka (JP)

(72) Inventors: Yuta Inoue, Osaka (JP); Yosuke Matsushita, Osaka (JP); Keisuke Nagata, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 62 days.

(21) Appl. No.: 18/381,064

(22) Filed: Oct. 17, 2023

(65) Prior Publication Data

US 2024/0132077 A1 Apr. 25, 2024
US 2024/0227817 A9 Jul. 11, 2024

(30) Foreign Application Priority Data

Oct. 24, 2022 (JP) .................................. 2022-170066

(51) Int. Cl.
*B60W 40/08* (2012.01)

(52) U.S. Cl.
CPC ..... *B60W 40/08* (2013.01); *B60W 2040/0827* (2013.01); *B60W 2040/0845* (2013.01); *B60W 2040/0872* (2013.01); *B60W 2540/221* (2020.02)

(58) Field of Classification Search
CPC ......... B60W 40/08; B60W 2040/0827; B60W 2040/0845; B60W 2040/0872; B60W 2540/221

See application file for complete search history.

(56) References Cited

U.S. PATENT DOCUMENTS

| | | | | |
|---|---|---|---|---|
| 2008/0204256 | A1* | 8/2008 | Omi | G08B 21/06 340/575 |
| 2016/0304099 | A1* | 10/2016 | Hatakeyama | A61B 5/7282 |
| 2017/0020432 | A1 | 1/2017 | Kusukame et al. | |
| 2017/0355377 | A1* | 12/2017 | Vijaya Kumar | B60W 50/0098 |
| 2019/0143815 | A1* | 5/2019 | Sato | B60K 35/00 340/439 |
| 2019/0336059 | A1* | 11/2019 | Takemoto | A61B 5/18 |
| 2020/0359954 | A1* | 11/2020 | Sunagawa | A61B 5/162 |

FOREIGN PATENT DOCUMENTS

| | | |
|---|---|---|
| JP | 2008-206688 | 9/2008 |
| JP | 5696632 | 2/2015 |
| JP | 2016-202419 | 12/2016 |

(Continued)

OTHER PUBLICATIONS

Japan Office Action issued in Japan Patent Application No. 2022-170066, dated Oct. 15, 2024, together with English translation thereof.

(Continued)

*Primary Examiner* — Mohamed Barakat
(74) *Attorney, Agent, or Firm* — Greenblum & Bernstein, P.L.C.

(57) ABSTRACT

A determination system includes a determiner that determines whether sleepiness of a driver who drives a mobile body is normal, based on sleepiness data regarding the sleepiness of the driver and reference data regarding sleepiness used as reference for determining whether the sleepiness of the driver is normal.

18 Claims, 16 Drawing Sheets

(56) References Cited

FOREIGN PATENT DOCUMENTS

| | | | |
|---|---|---|---|
| JP | 2020-170471 | | 10/2020 |
| JP | 2020170471 A | * | 10/2020 |
| JP | 6857269 | | 3/2021 |
| JP | 7025457 | | 2/2022 |

OTHER PUBLICATIONS

Japan Office Action issued in Japan Patent Application No. 2022-170066, dated Feb. 4, 2025, together with English translation thereof.

Japan Office Action issued in Japan Patent Application No. 2022-170066, dated May 20, 2025, together with English translation thereof.

* cited by examiner

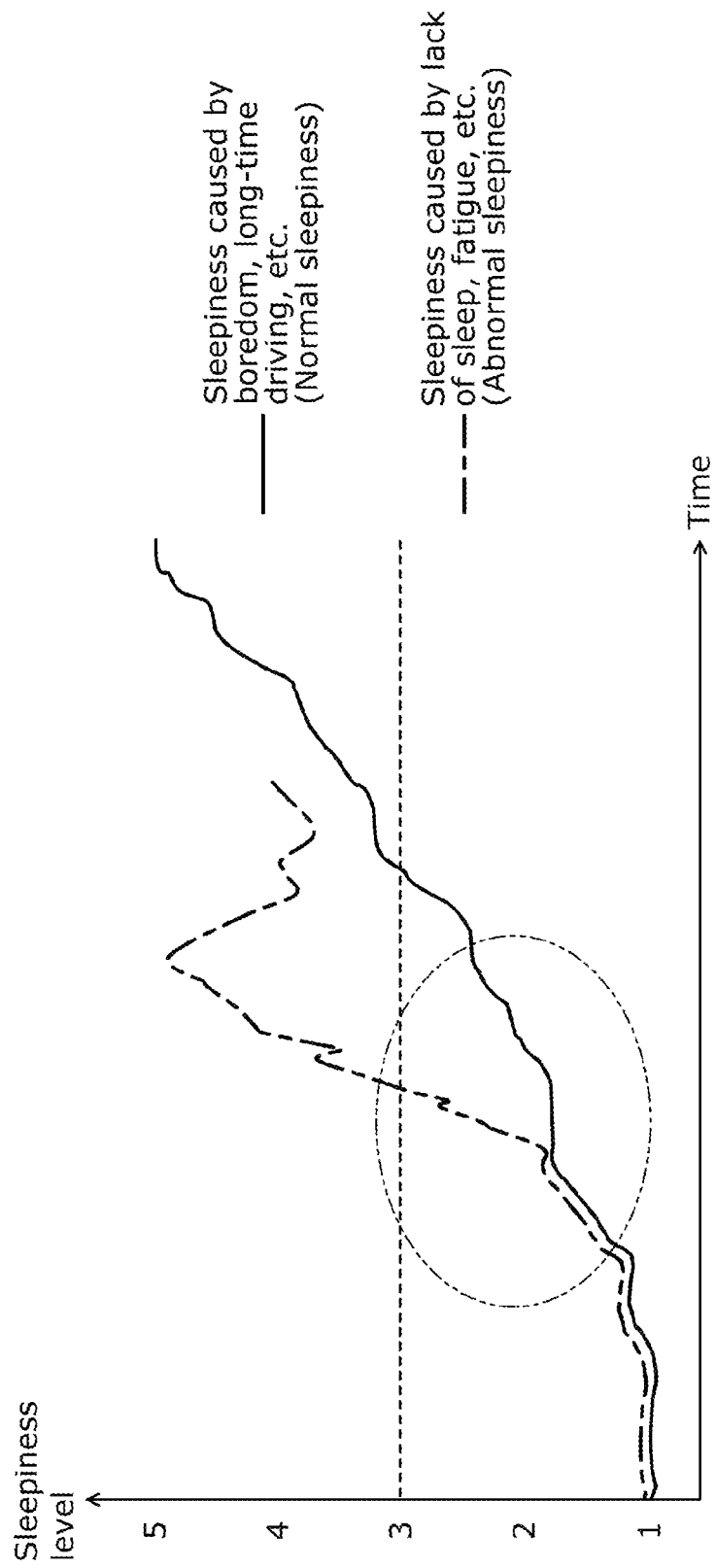

DETERMINATION SYSTEM

CROSS REFERENCE TO RELATED APPLICATION

The present application is based on and claims priority of Japanese Patent Application No. 2022-170066 filed on Oct. 24, 2022.

FIELD

The present disclosure relates to determination systems.

BACKGROUND

Patent Literature (PTL) 1 discloses a sleepiness prediction device that predicts whether a sleepiness level will increase.

CITATION LIST

Patent Literature

PTL 1: Japanese Patent No. 5696632

SUMMARY

However, the sleepiness prediction device according to PTL 1 can be improved upon.

In view of this, the present disclosure provides a determination system capable of improving upon the above related art.

A determination system according to an aspect of the present disclosure includes a determiner that determines whether sleepiness of a driver who drives a mobile body is normal, based on sleepiness data regarding the sleepiness of the driver and reference data regarding sleepiness used as reference for determining whether the sleepiness of the driver is normal.

Note these general or specific aspects may be implemented using a system, a method, an integrated circuit, a computer program, or a computer-readable recording medium such as a compact disk read-only memory (CD-ROM), or any combination of systems, methods, integrated circuits, computer programs, or recording media. The recording medium may be a non-transitory recording medium.

The determination system according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 16 is a graph illustrating an example of normal sleepiness and abnormal sleepiness.

DESCRIPTION OF EMBODIMENTS

Figure 1:
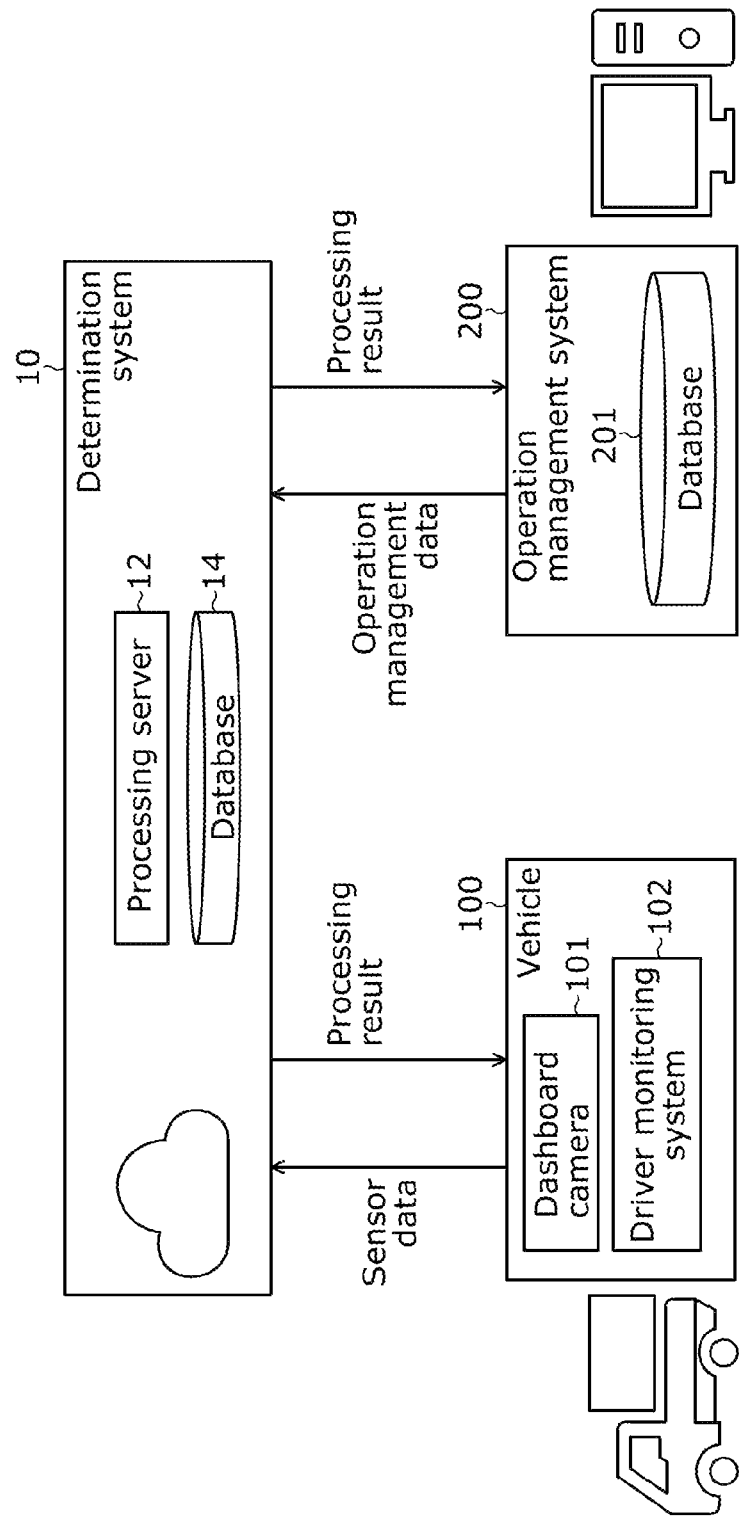
FIG. 1 is a schematic diagram illustrating a determination system and the like according to an embodiment.

Underlying Knowledge Forming Basis of the Present Disclosure

The present inventors found that the following circumstances arise with the technique described in the section "Background."

The circumstances with the sleepiness prediction device according to PTL 1 are that determination of whether sleepiness is normal is not assumed.

In view of the above circumstances, a determination system according to an aspect of the present disclosure includes a determiner that determines whether sleepiness of a driver who drives a mobile body is normal, based on sleepiness data regarding the sleepiness of the driver and reference data regarding sleepiness used as reference for determining whether the sleepiness of the driver is normal.

Accordingly, whether the sleepiness of the driver is normal can be determined based on the sleepiness data and the reference data.

Further, in the determination system according to an aspect of the present disclosure, the determiner may make a comparison between a first change speed that is a change speed of sleepiness indicated by the sleepiness data and a second change speed that is a change speed of sleepiness indicated by the reference data, and determine that the sleepiness of the driver is not normal when the first change speed is greater than the second change speed.

Accordingly, it is possible to determine that the sleepiness of the driver is not normal when the first change speed is greater than the second change speed.

Further, in the determination system according to an aspect of the present disclosure, the determiner may calculate a correction value for correcting the sleepiness data.

Accordingly, whether the sleepiness of the driver is normal can be determined based on the sleepiness data corrected using the correction value and the reference data. Therefore, it is possible to determine whether the sleepiness of the driver is normal, with higher precision.

Further, in the determination system according to an aspect of the present disclosure, the determiner may calculate the correction value that reduces a change in the sleepiness of the driver caused by an external factor that affects sleepiness.

Accordingly, whether the sleepiness of the driver is normal can be determined based on the sleepiness data corrected in such a manner as to reduce the change in the sleepiness of the driver caused by an external factor and the reference data. Therefore, it is possible to determine whether the sleepiness is made not normal by a factor other than the external factor, with higher precision.

Further, in the determination system according to an aspect of the present disclosure, the determiner may calculate the correction value that reduces a change in the sleepiness of the driver caused by the driver having lunch.

Accordingly, whether the sleepiness of the driver is normal can be determined based on the sleepiness data corrected in such a manner as to reduce the change in the sleepiness of the driver caused by having lunch and the reference data. Therefore, it is possible to determine whether the sleepiness is made not normal by a factor other than having lunch, with higher precision.

Further, in the determination system according to an aspect of the present disclosure, the determiner may make a comparison between first sleepiness that is indicated by the sleepiness data and is the sleepiness of the driver at a drive starting point at which the driver has started driving the mobile body and second sleepiness that is indicated by the reference data and is sleepiness of the driver in past at the drive starting point, and determine that the sleepiness of the driver is not normal when the first sleepiness is greater than the second sleepiness.

Accordingly, it is possible to determine that the sleepiness of the driver is not normal when the first sleepiness is greater than the second sleepiness.

Further, in the determination system according to an aspect of the present disclosure, the determiner may determine whether the sleepiness of the driver is normal, based on the sleepiness data indicating sleepiness having an increasing tendency and the reference data.

Accordingly, it is possible to determine whether the sleepiness of the driver is normal in a state where the sleepiness of the driver is increasing.

Further, the determination system according to an aspect of the present disclosure may further include an estimator that, when the determiner determines that the sleepiness of the driver is not normal, estimates a factor for the sleepiness of the driver being not normal.

Accordingly, it is possible to estimate a factor for the sleepiness of the driver being not normal.

Further, in the determination system according to an aspect of the present disclosure, the estimator may estimate the factor, based on the sleepiness data and the reference data.

Accordingly, the factor for the sleepiness of the driver being not normal can be estimated based on the sleepiness data and the reference data. Therefore, it is possible to estimate the factor for the sleepiness of the driver being not normal, with higher precision.

Further, in the determination system according to an aspect of the present disclosure, the estimator may estimate the factor, based on at least one of: a section in which the determiner has determined that the sleepiness of the driver is not normal; the sleepiness of the driver at a drive starting point at which the driver has started driving the mobile body; or biological information on the driver.

Accordingly, the factor for the sleepiness of the driver being not normal can be estimated based on at least one of: the section in which the determiner has determined that the sleepiness of the driver is not normal; the sleepiness of the driver at the drive starting point at which the driver has started driving the mobile body; or biological information on the driver. Therefore, it is possible to estimate the factor for the sleepiness of the driver being not normal, with higher precision.

Further, in the determination system according to an aspect of the present disclosure, the estimator may estimate, as the factor, an internal factor that affects sleepiness.

Accordingly, it is possible to estimate an internal factor for the sleepiness of the driver being not normal.

Further, the determination system according to an aspect of the present disclosure may further include a controller that controls a report to the mobile body, based on a result of determination made by the determiner.

Accordingly, the report to the mobile body can be controlled, based on the result of determination made by the determiner. Therefore, it is possible for the driver of the mobile body not to receive a report in particular when the sleepiness of the driver is normal and to receive a report when the sleepiness of the driver is not normal.

Further, the determination system according to an aspect of the present disclosure may further include a generator that extracts at least one past data item regarding sleepiness in past, based on a route on which the sleepiness data was obtained and a time frame in which the sleepiness data was obtained, and generates the reference data based on the at least one past data item.

Accordingly, the reference data can be generated using the at least one past data item extracted based on the route on which the sleepiness data was obtained and the time frame in which the sleepiness data was obtained. Therefore, it is possible to determine whether the sleepiness of the driver is normal, with higher precision.

Further, in the determination system according to an aspect of the present disclosure, the generator may extract, as the at least one past data item, (i) a plurality of past data items that are regarding sleepiness in past and were obtained on a route identical to the route on which the sleepiness data was obtained, (ii) a plurality of past data items that are regarding sleepiness in past and were obtained on a route that overlaps the route on which the sleepiness data was obtained, or (iii) a plurality of past data items that are regarding sleepiness in past and were obtained in a predetermined section of a route which starts at a starting point identical to a starting point of the route on which the sleepiness data was obtained, the predetermined section starting at the starting point.

Accordingly, the reference data can be generated using the at least one past data item obtained on a route identical or similar to the route on which the sleepiness data was obtained. Therefore, it is possible to determine whether the sleepiness of the driver is normal, with higher precision.

Further, in the determination system according to an aspect of the present disclosure, the external factor may be any one of weather, congestion, a month, a date, or a room temperature.

Further, in the determination system according to an aspect of the present disclosure, the biological information may be any one of a heart rate, a body temperature, or a respiratory rate of the driver.

Further, in the determination system according to an aspect of the present disclosure, the internal factor may be any one of taking medicine, lack of sleep, or fatigue from a previous day.

Further, in the determination system according to an aspect of the present disclosure, the sleepiness data may be time-series data of a sleepiness level that is an index indicating a magnitude of sleepiness.

Further, in the determination system according to an aspect of the present disclosure, the mobile body may be a vehicle.

Hereinafter, embodiments will be specifically described with reference to the drawings.

Note that the following embodiments each illustrate a general or specific example. The numerical values, shapes, materials, constituent elements, the arrangement and connection of the constituent elements, steps, the processing order of the steps etc. illustrated in the following embodiments are mere examples, and are not intended to limit the present disclosure. Among the constituent elements in the following embodiments, those not recited in any of the independent claims will be described as optional constituent elements. Furthermore, the drawings are represented schematically and are not necessarily precise illustrations. In the drawings, the same constituent components are given the same reference signs.

Embodiment

FIG. 1 is a schematic diagram illustrating determination system 10 and the like according to an embodiment.

Determination system 10 is a system that determines whether sleepiness of a driver of vehicle 100 is normal. As illustrated in FIG. 1, determination system 10 includes processing server 12 and database 14. Processing server 12 performs various types of processing. Database 14 is a database that includes, for example, various types of data to be used for the processing by processing server 12. For example, determination system 10 is implemented by cloud computing.

Vehicle 100 is an example of a mobile body. For example, vehicle 100 is an automobile. Note that the mobile body may be, for example, a vehicle without wheels. A driver of vehicle 100 gets into vehicle 100 and drives vehicle 100. For example, vehicle 100 is a vehicle for delivering packages, and the driver causes vehicle 100 to travel on a predetermined route. For example, vehicle 100 includes at least one sensor and transmits sensor data obtained by using the at least one sensor to determination system 10. For example, the at least one sensor includes a sensor for estimating sleepiness of a driver, a sensor for detecting biological information on the driver, a sensor for detecting route information regarding a route on which vehicle 100 travels, and a sensor for detecting vehicle information regarding vehicle 100. In the present embodiment, the at least one sensor includes dashboard camera 101 and driver monitoring system 102.

Operation management system 200 manages operation of vehicle 100. Operation management system 200 includes database 201. Database 201 is a database that includes operation management data regarding operation management of vehicle 100. For example, the operation management data indicates a route on which vehicle 100 travels and a time frame in which vehicle 100 travels the route. Operation management system 200 transmits the operation management data to determination system 10. For example, operation management system 200 is implemented by a computer.

Determination system 10 performs, for example, determination processing as to whether sleepiness of a driver is normal, based on the sensor data and the operation management data, and transmits a result of the processing to vehicle 100 and operation management system 200.

Figure 2:
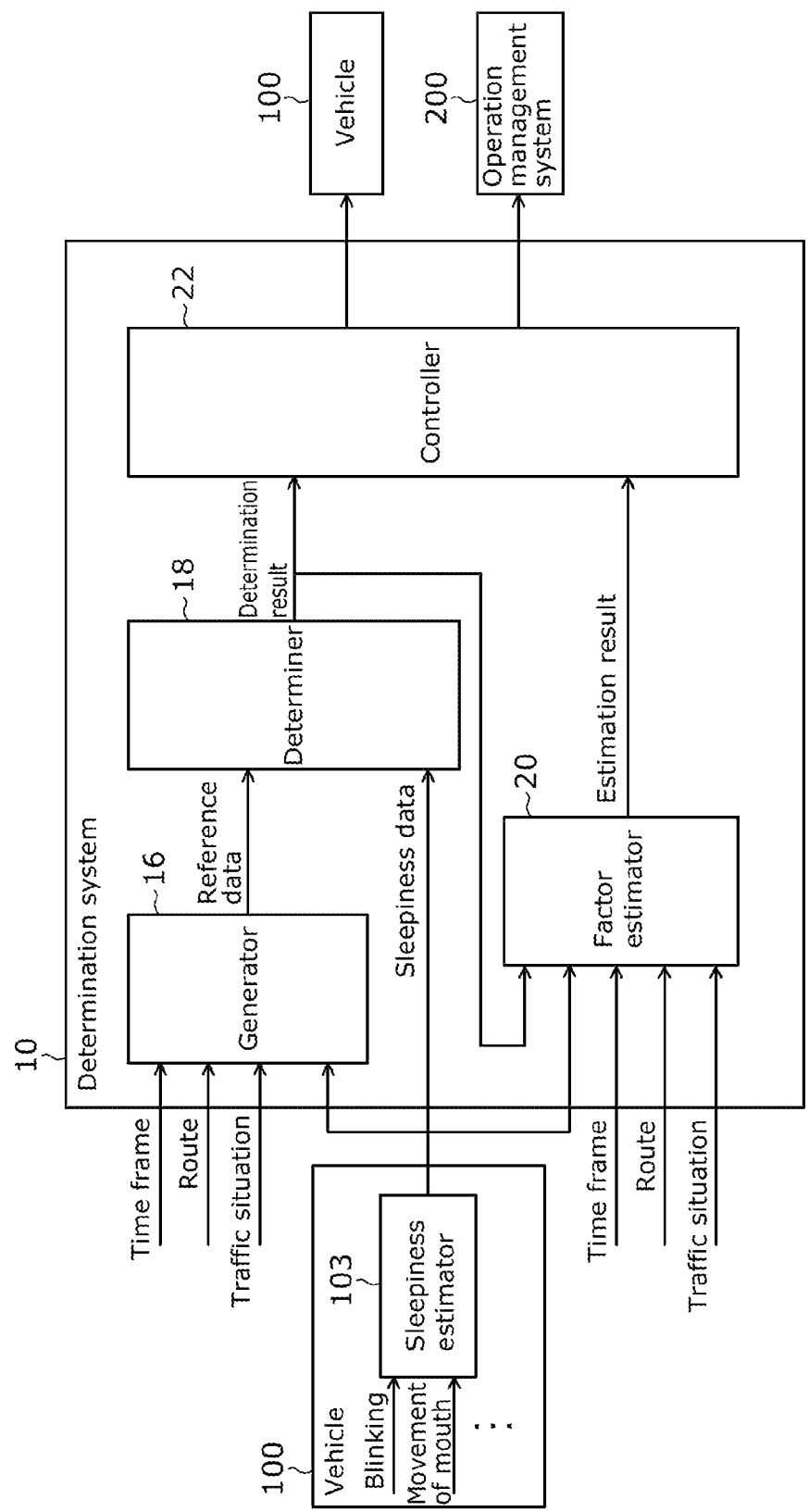
FIG. 2 is a block diagram illustrating a functional configuration of the determination system and the like in FIG. 1.

FIG. 2 is a block diagram illustrating a functional configuration of determination system 10 and the like in FIG. 1.

As illustrated in FIG. 2, vehicle 100 further includes sleepiness estimator 103. Sleepiness estimator 103 estimates sleepiness of a driver. For example, sleepiness estimator 103 estimates a sleepiness level of the driver. The sleepiness level is an index indicating a magnitude (strength) of sleepiness. A higher sleepiness level indicates that greater (stronger) sleepiness is felt. In short, sleepiness estimator 103 estimates, for example, how strong a magnitude of sleepiness felt by a driver is. For example, sleepiness estimator 103 estimates sleepiness of a driver, based on a frequency of blinking of the driver, movement of mouth of the driver, and the like obtained by driver monitoring system 102. For example, as a frequency of blinking of a driver increases, sleepiness estimator 103 estimates that a sleepiness level of the driver is high. For example, as a frequency of movement of the mouth of a driver decreases, sleepiness estimator 103 estimates that a sleepiness level of the driver is high. For example, sleepiness estimator 103 repeatedly estimates sleepiness of a driver at predetermined time intervals. Sleepiness estimator 103 transmits sleepiness data indicating sleepiness of a driver to determination system 10. For example, the sleepiness data is time-series data of the sleepiness level of the driver. For example, sleepiness estimator 103 is implemented by a processor. Note that, for example, sleepiness estimator 103 may be included in determination system 10 rather than in vehicle 100.

Determination system 10 includes generator 16, determiner 18, factor estimator 20, and controller 22. For example, generator 16, determiner 18, factor estimator 20, and controller 22 are implemented by a processor, a memory, and a wireless communication module.

Generator 16 extracts at least one past data item regarding sleepiness in the past, based on a route on which sleepiness data is obtained and a time frame in which the sleepiness data is obtained, and generates the reference data based on the at least one past data item. The reference data is data regarding sleepiness used as a reference for determining whether sleepiness of a driver is normal. For example, the reference data is time-series data of a sleepiness level. For example, generator 16 generates the reference data, based on a route on which vehicle 100 is traveling, a time frame in which vehicle 100 is traveling on the route, and a traffic situation of the route on which vehicle 100 is traveling. For example, information indicating the route on which vehicle 100 is traveling, the time frame in which vehicle 100 is traveling on the route, and the traffic situation of the route on which vehicle 100 is traveling is included in the sensor data and the operation management data.

Determiner 18 determines whether sleepiness of a driver is normal. Determiner 18 determines whether sleepiness of a driver who drives vehicle 100 is normal, based on sleepiness data regarding the sleepiness of the driver and reference data regarding sleepiness used as a reference for determining whether the sleepiness of the driver is normal. For example, determiner 18 makes a comparison between an ascending speed (increasing speed) of a sleepiness level of a driver and a tolerable ascending speed that is a tolerable ascending speed (tolerable increasing speed) of sleepiness. When the ascending speed of the sleepiness level of the driver is greater than the tolerable ascending speed, determiner 18 determines that sleepiness of the driver is not normal. For example, determiner 18 makes a comparison between a sleepiness level of a driver and a tolerable sleepiness level that is a sleepiness level tolerable. When the sleepiness level of the driver is greater than the tolerable sleepiness level, determiner 18 determines that sleepiness of the driver is not normal. For example, the tolerable ascending speed is an ascending speed obtained by adding a threshold value to an ascending speed of a sleepiness level indicated by the reference data, and the tolerable sleepiness level is a sleepiness level obtained by adding a threshold value to a sleepiness level indicated by the reference data. FIG. 16 is a graph illustrating an example of normal sleepiness and abnormal sleepiness. Here, as illustrated in FIG. 16, sleepiness caused by boredom, long-time driving, or the like is assumed to be normal sleepiness. In contrast, sleepiness caused by lack of sleep, fatigue, or the like is assumed to be sleepiness that is not normal, that is, abnormal sleepiness. In the case where sleepiness develops immediately (an ascending speed of a sleepiness level is greater than the tolerable ascending speed) by a factor relating to a physical condition of a driver such as lack of sleep (see a region enclosed by a two-dot-dash line in FIG. 16), it is determined that the sleepiness has an abnormality, that is, it is determined that the sleepiness of the driver is not normal.

Determiner 18 outputs a determination result. For example, the determination result indicates whether sleepiness of a driver is normal and indicates, for example, a manifestation of an anomaly in the sleepiness of the driver appears when the sleepiness of the driver is not normal. For example, the manifestation of the anomaly in the sleepiness of the driver when the sleepiness of the driver is not normal is indicated by a change speed of the sleepiness of the driver, a magnitude of the sleepiness of the driver, a section in which the sleepiness of the driver is not normal (is abnormal), a time point at which the sleepiness of the driver becomes not normal (becomes abnormal).

Factor estimator 20 is an example of an estimator that, when determiner 18 determines that sleepiness of a driver is not normal, estimates a factor for the sleepiness of the driver being not normal. For example, factor estimator 20 estimates the factor for the sleepiness of the driver being not normal, based on the determination result made by determiner 18, a route on which vehicle 100 is traveling, a time frame in which vehicle 100 is traveling on the route, and a traffic situation of the route on which vehicle 100 is traveling. For example, information indicating the route on which vehicle 100 is traveling, the time frame in which vehicle 100 is traveling on the route, and the traffic situation of the route on which vehicle 100 is traveling is included in the sensor data and the operation management data. Factor estimator 20 outputs an estimation result. For example, the estimation result indicates the factor for the sleepiness of the driver being not normal. Specifically, for example, the estimation result indicates a degree of a possibility that the factor is taking medicine, a degree of a possibility that the factor is lack of sleep, and a degree of a possibility that the factor is fatigue from a previous day.

Controller 22 controls a report to vehicle 100, based on a determination result made by determiner 18. For example, when determiner 18 determines that sleepiness of a driver is not normal, controller 22 makes a report of the sleepiness of the driver being not normal, to vehicle 100. For example, controller 22 makes the report of the sleepiness of the driver being not normal to vehicle 100 by transmitting information indicating that the sleepiness of the driver is not normal, to vehicle 100. For example, when factor estimator 20 estimates a factor, controller 22 makes a report of the factor for the sleepiness of the driver being not normal, to vehicle 100. For example, controller 22 makes the report of the factor for the sleepiness of the driver being not normal, to vehicle 100, by transmitting information indicating the factor estimated by factor estimator 20, to vehicle 100. For example, when determiner 18 determines that the sleepiness of the driver is normal, controller 22 makes no report to vehicle 100. Likewise, controller 22 controls a report to operation management system 200.

Figure 3:
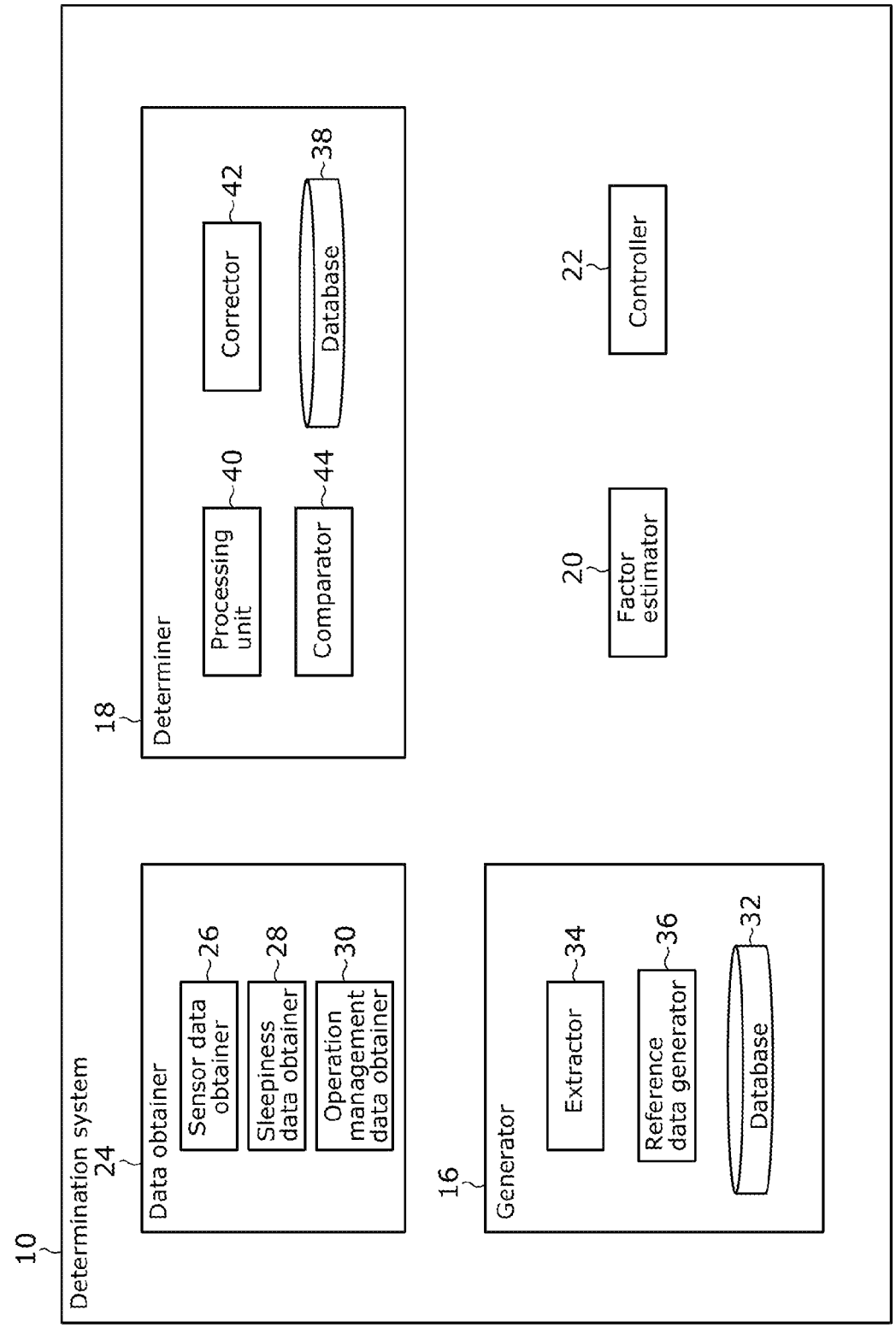
FIG. 3 is a block diagram illustrating a functional configuration of the determination system in FIG. 1.

FIG. 3 is a block diagram illustrating a functional configuration of determination system 10 in FIG. 1.

As illustrated in FIG. 3, determination system 10 further includes data obtainer 24.

Data obtainer 24 includes sensor data obtainer 26 that obtains sensor data, sleepiness data obtainer 28 that obtains sleepiness data, and operation management data obtainer 30 that obtains operation management data. Data obtainer 24 transmits the sensor data, the sleepiness data, and the operation management data obtained to generator 16, determiner 18, and factor estimator 20. For example, data obtainer 24 is implemented by a wireless communication module.

Generator 16 includes database 32, extractor 34, and reference data generator 36. Database 32 is a database that includes at least one past data item regarding sleepiness in the past. For example, each of the at least one past data item is time-series data of a sleepiness level. Extractor 34 extracts at least one past data item, based on a route on which sleepiness data is obtained and a time frame in which the sleepiness data is obtained. In the present embodiment, extractor 34 extracts the at least one past data item from database 32. Reference data generator 36 generates reference data, based on the at least one past data item extracted.

Determiner 18 includes database 38, processing unit 40, corrector 42, and comparator 44. Database 38 is a database that includes reference data and the like. Processing unit 40 performs various types of processing. For example, processing unit 40 performs processing of determining whether the sleepiness data obtained by data obtainer 24 is appropriate as data for determining whether sleepiness of a driver is normal. Corrector 42 calculates a correction value for correcting the sleepiness data and corrects the sleepiness data using the correction value. Comparator 44 makes a comparison between the sleepiness data and reference data.

Sensor data obtainer 26, sleepiness data obtainer 28, operation management data obtainer 30, extractor 34, reference data generator 36, processing unit 40, corrector 42, comparator 44, factor estimator 20, and controller 22 are included in processing server 12. Database 32 and database 38 are included in database 14.

Figure 4:
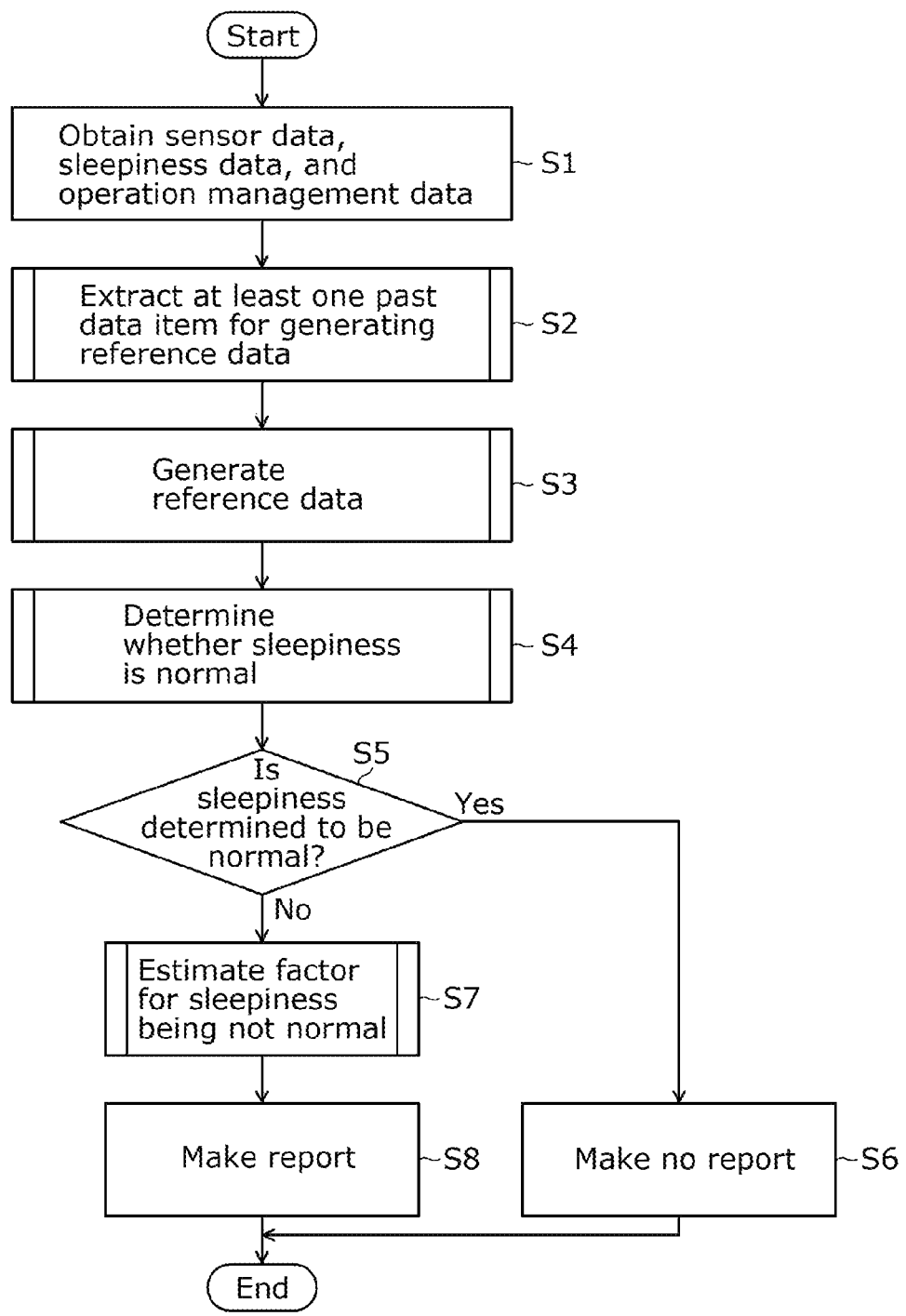
FIG. 4 is a flowchart illustrating an example of operation of the determination system in FIG. 1.

FIG. 4 is a flowchart illustrating an example of operation of determination system 10 in FIG. 1.

As illustrated in FIG. 4, determination system 10 first obtains sensor data, sleepiness data, and operation management data (step S1). In the present embodiment, the sensor data, the sleepiness data, and the operation management data are obtained by data obtainer 24.

Determination system 10 extracts at least one past data item for generating reference data (step S2). In the present embodiment, the at least one past data item is extracted by generator 16.

Determination system 10 generates the reference data (step S3). In the present embodiment, the reference data is generated by generator 16 using the at least one past data item.

Determination system 10 determines whether sleepiness of a driver is normal (step S4). In the present embodiment, whether the sleepiness of the driver is normal is determined by determiner 18.

Determination system 10 determines whether the sleepiness of the driver is determined to be normal (step S5). In the present embodiment, whether the sleepiness of the driver is determined to be normal is determined by determiner 18.

When the sleepiness of the driver is determined to be normal (Yes in step S5), determination system 10 ends the processing without making a report (step S6). For example, when the sleepiness of the driver is determined to be normal, controller 22 makes no report.

When the sleepiness of the driver is determined to be not normal (No in step S5), determination system 10 estimates a factor for the sleepiness of the driver being not normal (step S7). For example, when the sleepiness of the driver is determined to be not normal, factor estimator 20 estimates the factor for the sleepiness of the driver being not normal.

When estimating the factor for the sleepiness of the driver, determination system 10 makes a report (step S8). For example, when the sleepiness of the driver is determined to be not normal, controller 22 makes a report.

Figure 5:
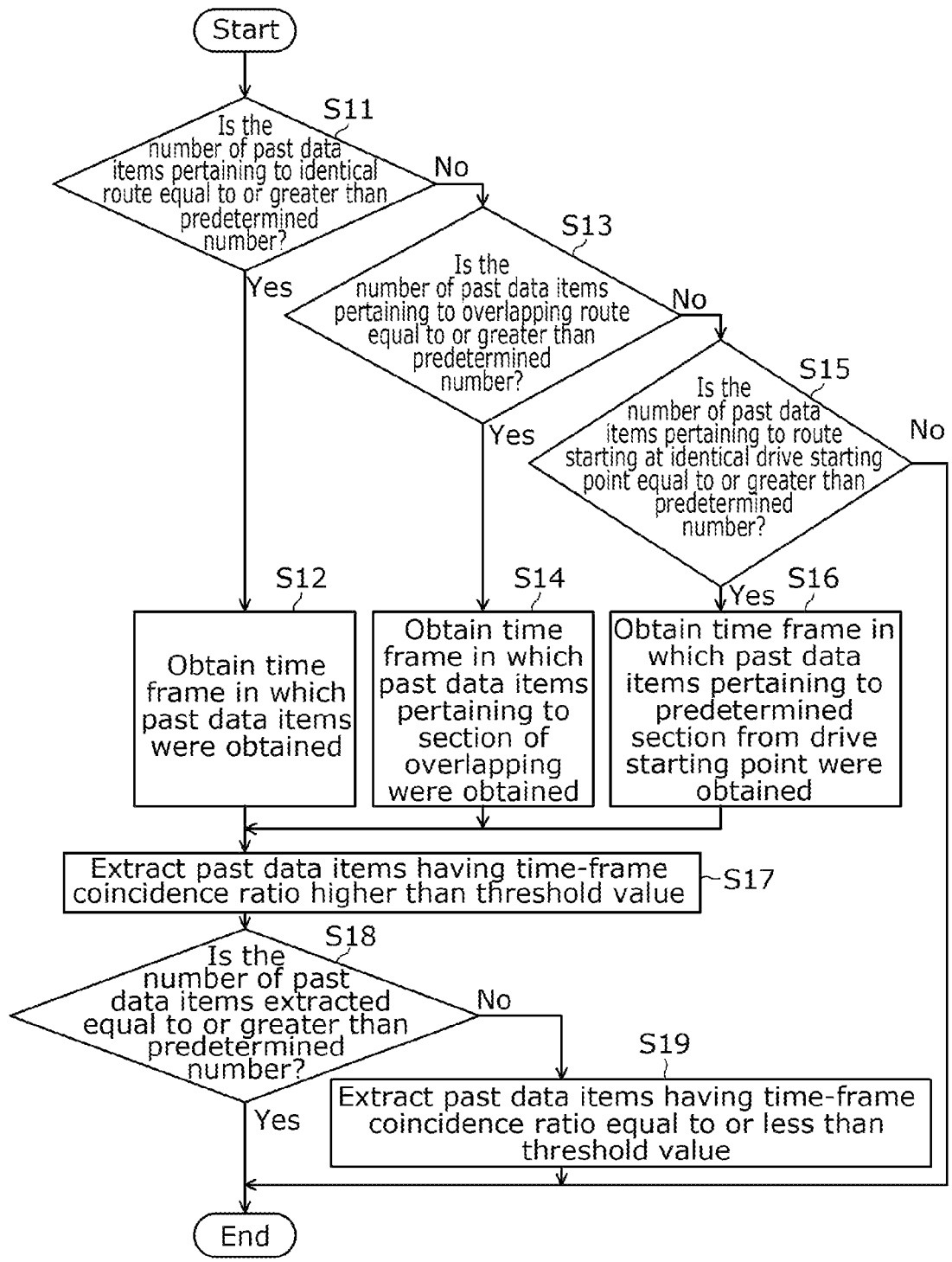
FIG. 5 is a flowchart illustrating an example of operation in step S2 in FIG. 4.

FIG. 5 is a flowchart illustrating an example of operation in step S2 in FIG. 4.

As illustrated in FIG. 5, extractor 34 first determines whether past data items pertaining to a route identical to a route from a drive starting point at which the driver has started driving vehicle 100 to a current point of vehicle 100 is equal to or greater than a predetermined number (step S11). For example, the route identical to the route from the drive starting point at which the driver has started driving vehicle 100 to the current point of vehicle 100 is a route that is totally identical to the route from the drive starting point at which the driver has started driving vehicle 100 to the current point of vehicle 100. For example, the past data items are data items regarding sleepiness in the past and are time-series data items of a sleepiness level. For example, the past data items pertaining to the route identical to the route from the drive starting point at which the driver has started driving vehicle 100 to the current point of vehicle 100 are time-series data items of a sleepiness level of the driver that were obtained when the driver caused vehicle 100 to travel on the route in the past. For example, extractor 34 determines whether the number of past data items in a plurality of past data items obtained within a predetermined number of years before the present is equal to or greater than the predetermined number.

When the number of the past data items pertaining to the route identical to the route from the drive starting point to the current point of vehicle 100 is equal to or greater than the predetermined number (Yes in step S11), extractor 34 obtains a time frame in which the past data items were obtained (step S12). For example, the past data items are associated with timestamps that indicate time points at which the past data items were obtained. Specifically, for example, the past data items are associated with timestamps that indicate time points at which sleepiness levels indicated by the past data items were obtained.

When the number of the past data items pertaining to the route identical to the route from the drive starting point to the current point of vehicle 100 is less than the predetermined number (No in step S11), extractor 34 determines whether the number of past data items pertaining to a route that overlaps the route from the drive starting point to the current point of vehicle 100 is equal to or greater than the predetermined number (step S13). For example, the past data items pertaining to the route overlapping the route from the drive starting point to the current point of vehicle 100 are time-series data items of a sleepiness level of the driver that were obtained when the driver caused vehicle 100 to travel on the route in the past.

When the number of the past data items pertaining to the route overlapping the route from the drive starting point to the current point of vehicle 100 is equal to or greater than the predetermined number (Yes in step S13), extractor 34 obtains a time frame in which the past data items pertaining to a section of the overlapping were obtained (step S14). The section of the overlapping is a section identical to the route from the drive starting point to the current point of vehicle 100, out of the route overlapping the route from the drive starting point to the current point of vehicle 100.

When the number of the past data items pertaining to the route overlapping the route from the drive starting point to the current point of vehicle 100 is less than the predetermined number (No in step S13), extractor 34 determines whether the number of past data items pertaining to a route that starts at a drive starting point identical to the drive starting point of vehicle 100 is equal to or greater than the predetermined number (step S15). In short, when the number of the past data items pertaining to the route overlapping the route from the drive starting point to the current point of vehicle 100 is less than the predetermined number, extractor 34 determines whether the number of past data items pertaining to a route which starts at a starting point identical to a starting point of the route from the drive starting point to the current point of vehicle 100 is equal to or greater than the predetermined number.

When the number of the past data items pertaining to the route that starts at the identical drive starting point is equal to or greater than the predetermined number (Yes in step S15), extractor 34 obtains a time frame in which past data items pertaining to a predetermined section were obtained (step S16). For example, the predetermined section is a temporal section of several tens of minutes from a start of driving.

When the number of the past data items pertaining to the route that starts at the identical drive starting point is less than the predetermined number (No in step S15), extractor 34 ends the processing.

Extractor 34 extracts past data items having a time-frame coincidence ratio that is higher than a threshold value (step S17). For example, 24 hours (1 day) is divided into 6 time frames of 4 hours. When one of the time frames in which the past data items were obtained is the same as one of the time frames in which the sleepiness data was obtained, the coincidence ratio is set to 100, when one of the time frames in which the past data items were obtained is adjacent to one of the time frames in which the sleepiness data was obtained, the coincidence ratio is set to 80, when one of the time frames in which the past data items were obtained is adjacent to one of the time frames in which the sleepiness data was obtained across one time frame, the coincidence ratio is set to 60, and when one of the time frames in which the past data items were obtained is adjacent to one of the time frames in which the sleepiness data was obtained across two time frames, the coincidence ratio is set to 40. For example, the threshold value is 50, and extractor 34 extracts past data items having coincidence ratios higher than 50 from among the past data items of which the number is determined to be the predetermined number or greater in step S11, step S13, or step S15.

Extractor 34 determines whether the number of the past data items extracted is equal to or greater than the predetermined number (step S18). Specifically, extractor 34 determines whether the number of the past data items extracted in step S17 is equal to or greater than the predetermined number.

When the number of the past data items extracted is equal to or greater than the predetermined number (Yes in step S18), extractor 34 ends the processing.

When the number of the past data items extracted is less than the predetermined number (No in step S18), extractor 34 extracts past data items having time-frame coincidence ratios equal to or less than the threshold value in descending order of time-frame coincidence ratio so that the number of the past data items becomes equal to or greater than the predetermined number (step S19), and then ends the processing.

In this manner, generator 16 extracts, as the at least one past data item, a plurality of past data items that are regarding sleepiness in the past and were obtained on a route identical to a route on which the sleepiness data was obtained, a plurality of past data items that are regarding sleepiness in the past and were obtained on a route that overlaps the route on which the sleepiness data was obtained, or a plurality of past data items that are regarding sleepiness in the past and were obtained in a predetermined section of a route which starts at a starting point identical to a starting point of the route on which the sleepiness data was obtained.

Figure 6:
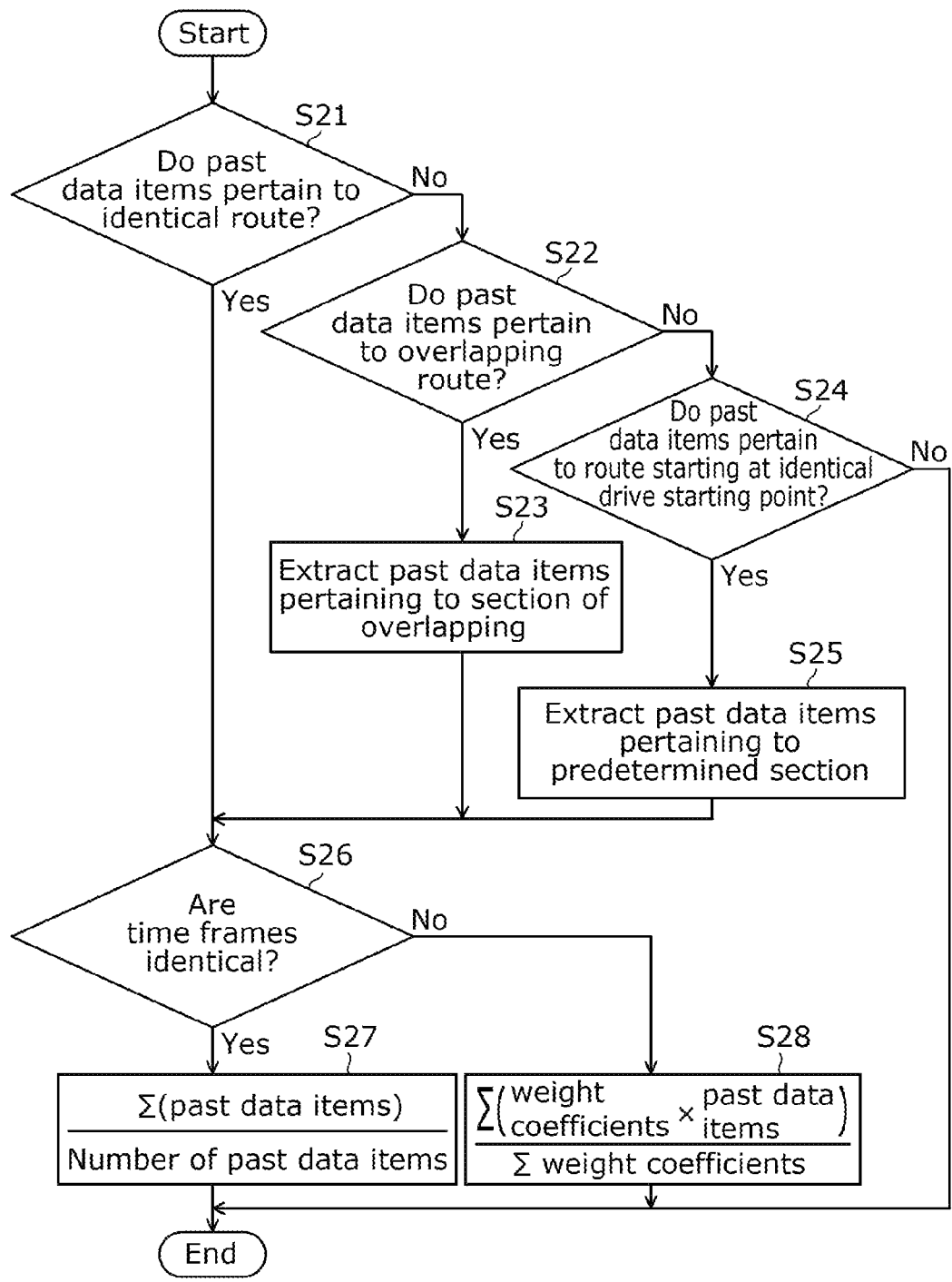
FIG. 6 is a flowchart illustrating an example of operation in step S3 in FIG. 4.

FIG. 6 is a flowchart illustrating an example of operation in step S3 in FIG. 4.

As illustrated in FIG. 6, reference data generator 36 first determines whether past data items pertain to the route identical to the route from the drive starting point to the current point of vehicle 100 (step S21). For example, reference data generator 36 determines whether the at least one past data item extracted in step S2 is a past data item pertaining to the route identical to the route from the drive starting point to the current point of vehicle 100.

When the past data items do not pertain to the route identical to the route from the drive starting point to the current point of vehicle 100 (No in step S21), reference data generator 36 determines whether the past data items pertain to a route that overlaps the route from the drive starting point to the current point of vehicle 100 (step S22). For example, reference data generator 36 determines whether the at least one past data item extracted in step S2 is a past data item pertaining to the route overlapping the route from the drive starting point to the current point of vehicle 100.

When the past data items pertain to the route overlapping the route from the drive starting point to the current point of vehicle 100 (Yes in step S22), reference data generator 36 extracts past data items pertaining to the section of the overlapping (step S23).

When the past data items do not pertain to the route overlapping the route from the drive starting point to the current point of vehicle 100 (No in step S22), reference data generator 36 determines whether the past data items pertain to a route that starts at a drive starting point identical to the drive starting point of vehicle 100 (step S24). For example, reference data generator 36 determines whether the at least one past data item extracted in step S2 is a past data item pertaining to the route that starts at the identical drive starting point.

When the past data items do not pertain to the route that starts at the identical drive starting point (No in step S24), reference data generator 36 ends the processing.

When the past data items pertain to the route that starts at the identical drive starting point (Yes in step S24), reference data generator 36 extracts past data items pertaining to a predetermined section (step S25).

Reference data generator 36 determines whether time frames are identical (step S26). For example, when a time frame at which each of the at least one past data item pertaining to the route identical to the route from the drive starting point to the current point of vehicle 100 was obtained is identical to a time frame in which sleepiness data was obtained, reference data generator 36 determines that the time frames are identical. In contrast, when a time frame at which at least one of the at least one past data item pertaining to the route identical to the route from the drive starting point to the current point of vehicle 100 was obtained is not identical to the time frame in which sleepiness data was obtained, reference data generator 36 determines that the time frames are not identical. For example, when a time frame at which each of the at least one past data item extracted in step S23 or step S25 was obtained is identical to the time frame in which the sleepiness data was obtained, reference data generator 36 determines that the time frames are identical. In contrast, when a time frame at which at least one of the at least one past data item extracted in step S23 or step S25 was obtained is not identical to the time frame in which the sleepiness data was obtained, reference data generator 36 determines that the time frames are not identical.

When the time frames are identical (Yes in step S26), reference data generator 36 calculates reference data by (Σ(past data items))/(the number of past data items) (step S27). For example, reference data generator 36 totalizes the at least one past data item pertaining to the route identical to the route from the drive starting point to the current point of vehicle 100 and divides the totalized data item by the number of the at least one past data item, thereby calculating the reference data. For example, reference data generator 36 totalizes the at least one past data item extracted in step S23 or step S25 and divides the totalized data item by the number of the at least one past data item, thereby calculating the reference data. For example, totalizing the at least one past data item is totalizing a sleepiness level at a time point indicated by the at least one past data item, and dividing the totalized data item by the number of the at least one past data item is dividing the sleepiness level at the time point obtained by the totalizing by the number of the at least one past data item.

When the time frames are not identical (No in step S26), reference data generator 36 calculates sleepiness data by (Σ(weight coefficients×past data items))/(Σ(weight coefficients)) (step S28). The weight coefficients are each set to have a greater value for a higher time-frame coincidence ratio. For example, a past data item having a time-frame coincidence ratio of 100 is to be multiplied by a weight coefficient of 10, a past data item having a time-frame coincidence ratio of 80 is to be multiplied by a weight coefficient of 8, a past data item having a time-frame coincidence ratio of 60 is to be multiplied by a weight coefficient of 6, a past data item having a time-frame coincidence ratio of 40 is to be multiplied by a weight coefficient of 4, and a past data item having a time-frame coincidence ratio of 20 is to be multiplied by a weight coefficient of 2. For example, reference data generator 36 totalizes the at least one past data item pertaining to the route identical to the route from the drive starting point to the current point of vehicle 100 that is multiplied by at least one corresponding weight coefficient and divides the totalized data item by a value obtained by totalizing a value of the at least one corresponding weight coefficient by which the at least one past data item is multiplied, thereby calculating the reference data. For example, reference data generator 36 totalizes the at least one past data item extracted in step S23 or step S25 that is multiplied by at least one corresponding weight coefficient and divides the totalized data item by a value obtained by totalizing a value of the at least one corresponding weight coefficient by which the at least one past data item is multiplied, thereby calculating the reference data. For example, totalizing the at least one past data item that is multiplied by at least one corresponding weight coefficient is multiplying a sleepiness level at a time point indicated by the at least one past data item by the at least one corresponding weight coefficient and totalizing the sleepiness level at the time point that is obtained by the multiplying of the at least one corresponding weight coefficient, and dividing the totalized data item by the value obtained by totalizing the value of the at least one corresponding weight coefficient by which the at least one past data item is multiplied is dividing the sleepiness level at the time point obtained by the totalizing by the value obtained by totalizing the value of the at least one corresponding weight coefficient by which the at least one past data item is multiplied.

Figure 7:
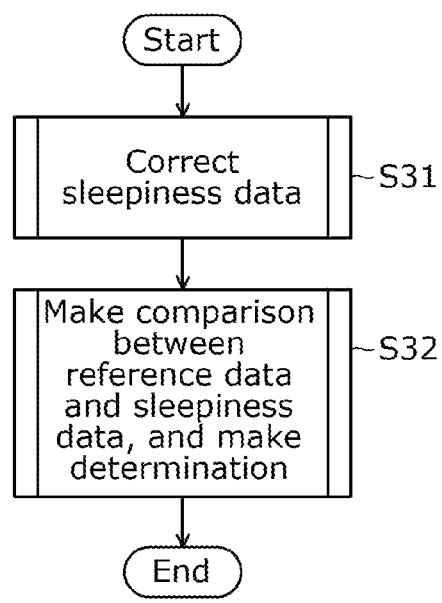
FIG. 7 is a flowchart illustrating an example of operation in step S4 in FIG. 4.

FIG. 7 is a flowchart illustrating an example of operation in step S4 in FIG. 4.

As illustrated in FIG. 7, determiner 18 first corrects the sleepiness data (step S31).

Determiner 18 makes a comparison between the reference data and the sleepiness data to determine whether sleepiness is normal (step S32).

Figure 8:
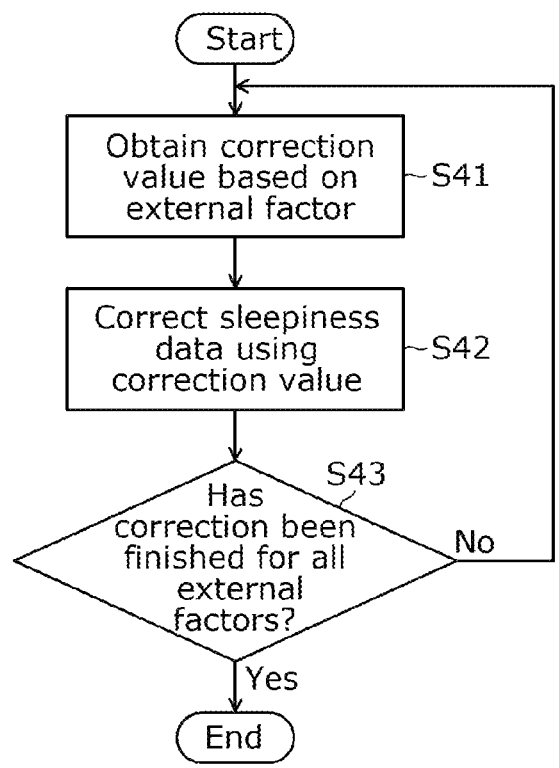
FIG. 8 is a flowchart illustrating an example of operation in step S31 in FIG. 7.

FIG. 8 is a flowchart illustrating an example of operation in step S31 in FIG. 7.

As illustrated in FIG. 8, corrector 42 first obtains a correction value based on an external factor (step S41). The external factor is an external factor that affects sleepiness. The correction value based on the external factor is a correction value that reduces a change in sleepiness of a driver caused by the external factor. For example, the external factor is weather, congestion, a month, a date, a room temperature, etc.

Corrector 42 uses the correction value to correct the sleepiness data (step S42).

Corrector 42 determines whether the correction has been finished for all external factors (step S43).

When the correction has not been finished for all external factors (No in step S43), corrector 42 obtains a correction value based on an external factor that has not been obtained (step S41).

When the correction has been finished for all external factors (Yes in step S43), corrector 42 ends the processing.

Figure 9:
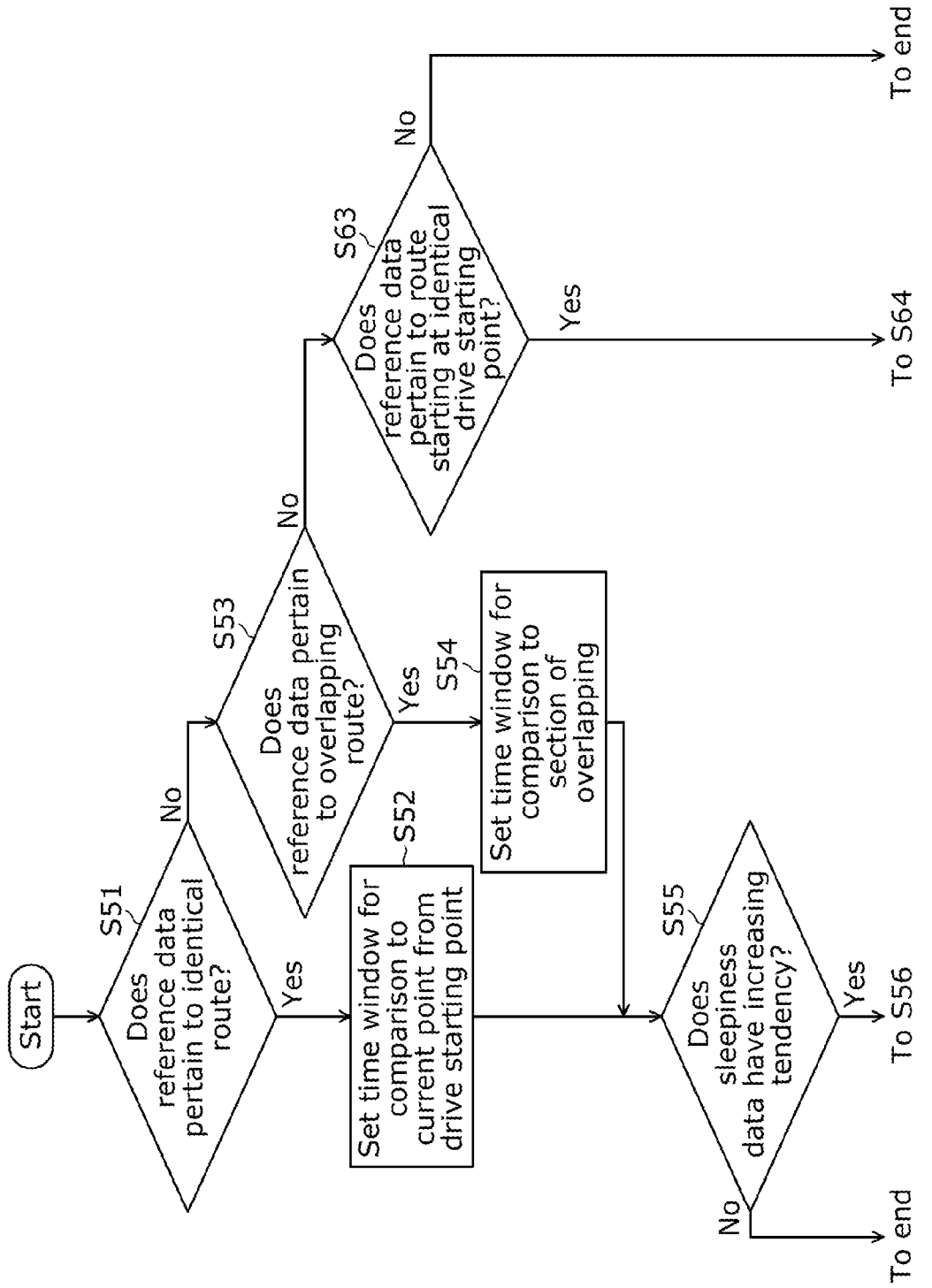
FIG. 9 is a flowchart illustrating an example of operation in step S32 in FIG. 7.
Figure 10:
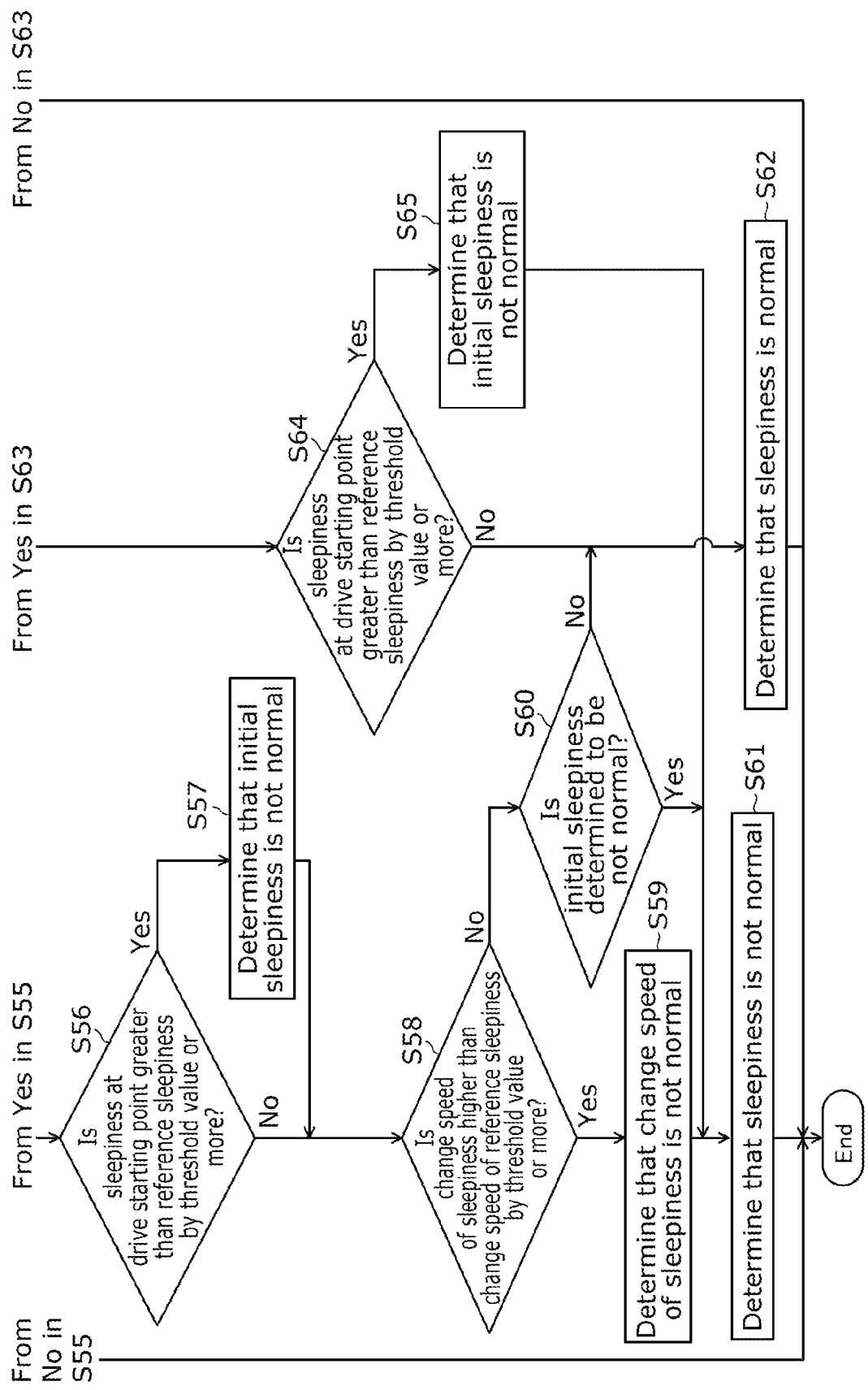
FIG. 10 is a flowchart illustrating an example of operation following the operation in FIG. 9.

FIG. 9 is a flowchart illustrating an example of operation in step S32 in FIG. 7. FIG. 10 is a flowchart illustrating an example of operation following the operation in FIG. 9.

As illustrated in FIG. 9, processing unit 40 first determines whether the reference data pertains to the route identical to the route from the drive starting point to the current point of vehicle 100 (step S51). The reference data pertaining to the route identical to the route from the drive starting point to the current point of vehicle 100 is reference data that is generated using the at least one past data item pertaining to the route identical to the route from the drive starting point to the current point of vehicle 100.

When the reference data pertains to the route identical to the route from the drive starting point to the current point of vehicle 100 (Yes in step S51), processing unit 40 sets a time window for a comparison between the sleepiness data and the reference data to the current point from the drive starting point (step S52).

When the reference data does not pertain to the route identical to the route from the drive starting point to the current point of vehicle 100 (No in step S51), processing unit 40 determines whether the reference data pertains to the route that overlaps the route from the drive starting point to the current point of vehicle 100 (step S53). The reference data pertaining to the route overlapping the route from the drive starting point to the current point of vehicle 100 is reference data that is generated using the at least one past data item pertaining to the route overlapping the route from the drive starting point to the current point of vehicle 100.

When the reference data pertains to the route overlapping the route from the drive starting point to the current point of vehicle 100 (Yes in step S53), processing unit 40 sets the time window for a comparison between the sleepiness data and the reference data to the section of the overlapping (step S54).

After setting the time window, processing unit 40 determines whether the sleepiness data has an increasing tendency (step S55). For example, processing unit 40 passes the sleepiness data (time-series data) through a low-pass filter to generate sleepiness data without small oscillations, then calculates temporal difference values on the sleepiness data, and determines a monotonically increasing property of the sleepiness data to determine whether the sleepiness data has an increasing tendency.

When the sleepiness data has no increasing tendency (No step S55), processing unit 40 ends the processing.

When the sleepiness data has an increasing tendency (Yes in step S55), comparator 44 determines whether sleepiness at the drive starting point is greater than reference sleepiness by a threshold value or more, as illustrated in FIG. 10 (step S56). The reference sleepiness is sleepiness indicated by the reference data. For example, when the threshold value is 0.5, comparator 44 determines whether a sleepiness level of sleepiness at the drive starting point is equal to or greater than a level that is a sleepiness level of the reference sleepiness at the drive starting point to which 0.5 is added.

When the sleepiness at the drive starting point is greater than the reference sleepiness by the threshold value or more (Yes in step S56), comparator 44 determines that initial sleepiness is not normal (step S57).

When the sleepiness at the drive starting point is not greater than the reference sleepiness by the threshold value or more (No in step S56), comparator 44 determines whether a change speed of sleepiness is greater than a change speed of the reference sleepiness by a threshold value or more (step S58). For example, when the threshold value is 0.5, comparator 44 determines whether a speed of increase in (a change speed of) the sleepiness is greater than a speed of increase (a change speed of) the reference sleepiness to which 0.5 is added.

When the change speed of sleepiness is greater than the change speed of the reference sleepiness by the threshold value or more (Yes in step S58), comparator 44 determines that the change speed of sleepiness is not normal (step S59).

When the change speed of sleepiness is not greater than the change speed of the reference sleepiness by the threshold value or more (No in step S58), comparator 44 determines whether the initial sleepiness is determined to be not normal (step S60).

Comparator 44 determines that the sleepiness is not normal (step S61) when determining that the change speed of sleepiness is not normal (step S59) or when determining that the initial sleepiness is not normal (Yes in step S60).

When the initial sleepiness is not determined to be not normal (No in step S60), comparator 44 determines that the sleepiness is normal (step S62) and ends the processing.

Referring back to FIG. 9, when the reference data does not pertain to the route overlapping the route from the drive starting point to the current point of vehicle 100 (No in step S53), processing unit 40 determines whether the past data items pertain to the route that starts at the identical drive starting point (step S63).

When the past data items pertain to the route that starts at the identical drive starting point (Yes in step S63), comparator 44 determines whether the sleepiness at the drive starting point is greater than reference sleepiness by the threshold value or more, as illustrated in FIG. 10 (step S64). Comparator 44 determines whether the sleepiness at the drive starting point is greater than the reference sleepiness by the threshold value or more, as in step S56.

When the sleepiness at the drive starting point is greater than the reference sleepiness by the threshold value or more (Yes in step S64), comparator 44 determines that initial sleepiness is not normal (step S65).

When the sleepiness at the drive starting point is not greater than the reference sleepiness by the threshold value or more (No in step S64), comparator 44 determines that the sleepiness is normal (step S62) and ends the processing.

Referring back to FIG. 9, when the past data items do not pertain to the route that starts at the identical drive starting point (No in step S63), processing unit 40 ends the processing, as illustrated in FIG. 10.

In such a manner as described above, determiner 18 makes a comparison between a first change speed that is a change speed of sleepiness indicated by the sleepiness data and a second change speed that is a change speed of sleepiness indicated by the reference data, and determines that the sleepiness of the driver is not normal when the first change speed is greater than the second change speed.

Determiner 18 makes a comparison between first sleepiness that is indicated by the sleepiness data and is the sleepiness of the driver at the drive starting point at which the driver has started driving vehicle 100 and second sleepiness that is indicated by the reference data and is sleepiness of the driver in the past at the drive starting point, and determines that the sleepiness of the driver is not normal when the first sleepiness is greater than the second sleepiness.

Further, determiner 18 determines whether the sleepiness of the driver is normal, based on the sleepiness data indicating sleepiness having an increasing tendency and the reference data.

Figure 11:
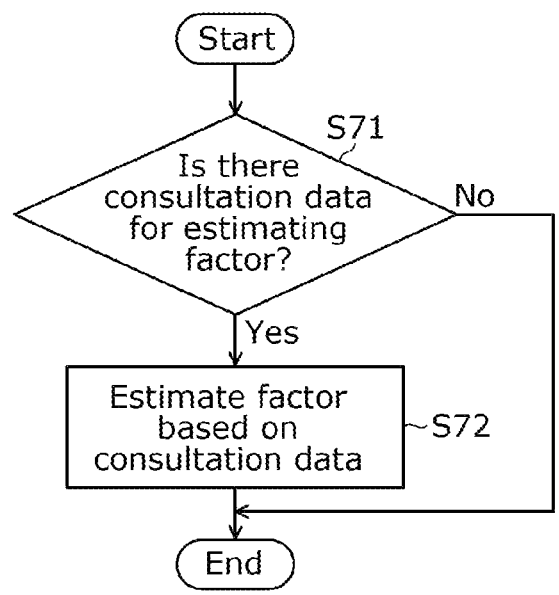
FIG. 11 is a flowchart illustrating an example of operation in step S7 in FIG. 4.

FIG. 11 is a flowchart illustrating an example of operation in step S7 in FIG. 4.

As illustrated in FIG. 11, factor estimator 20 first determines whether there is consultation data for estimating a factor (step S71). For example, the consultation data is data that indicates a month or a date in or on which the sleepiness data was obtained.

When there is the consultation data (Yes in step S71), factor estimator 20 estimates a factor based on the consultation data (step S72). For example, when the month indicated by the consultation data is a pollen month with a high pollen count, factor estimator 20 estimates that the factor is taking medicine for pollinosis. In this manner, for example, factor estimator 20 estimates an internal factor as a factor for the sleepiness of the driver being not normal. Examples of the internal factor include taking medicine, lack of sleep, and fatigue from a previous day.

When there is no consultation data (No step S71), factor estimator 20 ends the processing.

Figure 12:
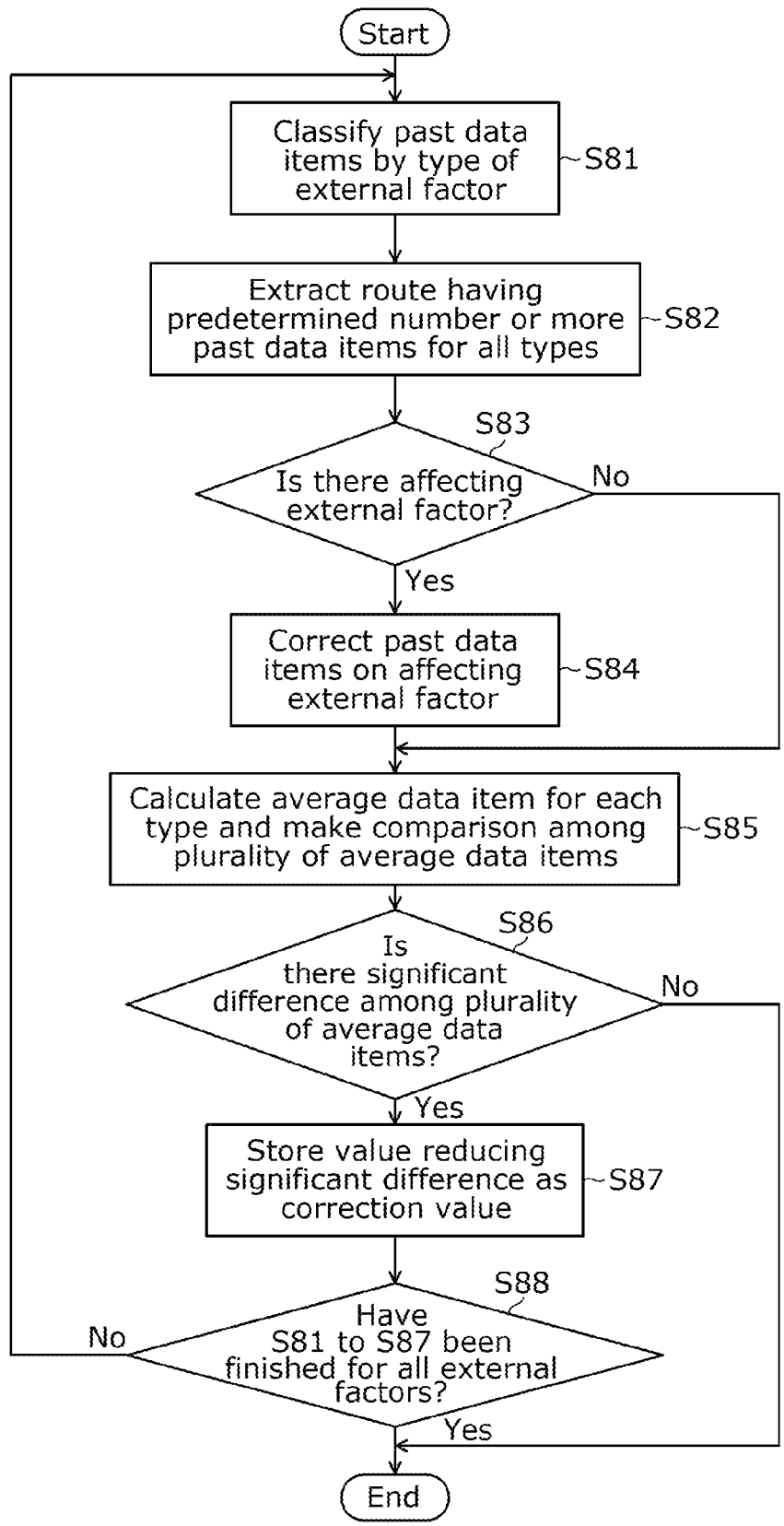
FIG. 12 is a flowchart illustrating an example of another operation of the determination system in FIG. 1.

FIG. 12 is a flowchart illustrating an example of another operation of determination system 10 in FIG. 1.

As illustrated in FIG. 12, corrector 42 first classifies the past data items by type of external factor (step S81). For example, when an external factor is weather, the types of the external factor include sunny, cloudy, rainy, and snowy. For example, when an external factor is congestion, the types of the external factor include congested and not congested. For example, when external factors are room temperature, humidity, atmospheric pressure, and illuminance, the types of the external factors include their respective ranges. For example, when an external factor is month, the type of the external factor includes January to December. For example, corrector 42 classifies the past data items into past data items obtained when it is sunny, past data items obtained when it is cloudy, past data items obtained when it is rainy, and past data items obtained when it is snowy.

Corrector 42 extracts a route that has a predetermined number or more past data items for all types (step S82). For example, corrector 42 extracts a route that has the predetermined number or more past data items obtained when it is sunny, the predetermined number or more past data items obtained when it is cloudy, the predetermined number or more past data items obtained when it is rainy, and the predetermined number or more past data items obtained when it is snowy.

Corrector 42 determines whether there is an affecting external factor (step S83). For example, weather, congestion, room temperature, humidity, atmospheric pressure, and illuminance are unaffecting external factors, and month is an affecting external factor. For example, when a plurality of past data items classified by type of weather differ in type of month in which the plurality of past data items were obtained, corrector 42 determines that there is an affecting external factor.

When there is an affecting external factor (Yes in step S83), corrector 42 corrects the past data items on the affecting external factor (step S84). For example, corrector 42 makes the correction in such a manner as to reduce past data items classified as being in pollen months (e.g., March, April) out of a plurality of past data items classified by type of weather.

When there is no affecting external factor (No in step S83) or when the past data items are corrected on the affecting external factor (step S84), corrector 42 calculates an average data item for each type of external factor and makes a comparison among the plurality of average data items (step S85). For example, corrector 42 calculates an average data item obtained by averaging at least one past data item obtained when it is sunny, an average data item obtained by averaging at least one past data item obtained when it is cloudy, an average data item obtained by averaging at least one past data item obtained when it is rainy, and an average data item obtained by averaging at least one past data item obtained when it is snowy, and makes a comparison among the plurality of average data items.

Corrector 42 determines whether there is a significant difference among the plurality of average data items (step S86). Examples of the significant difference include a difference in sleepiness level equal to or larger than a predetermined one and a difference in change speed (ascending speed) of sleepiness level equal to or larger than a predetermined one.

When there is a significant difference among the plurality of average data items (Yes in step S86), corrector 42 stores such a value that reduces the significant difference, as a correction value (step S87).

Corrector 42 determines whether step S81 to step S87 have been finished for all external factors (step S88).

When step S81 to step S87 have not been finished for all external factors (No in step S88), for an external factor for which step S81 to step S87 have not been finished, corrector 42 classifies the past data items by type of the external factor (step S81).

When there is no significant difference among the plurality of average data items (No in step S86) or when step S81 to step S87 have not been finished for all external factors (Yes in step S88), corrector 42 ends the processing.

In this manner, determiner 18 calculates the correction value that reduces a change in the sleepiness of the driver caused by an external factor that affects sleepiness. For example, determiner 18 calculates a correction value that reduces a change in the sleepiness of the driver caused by weather.

Figure 13:
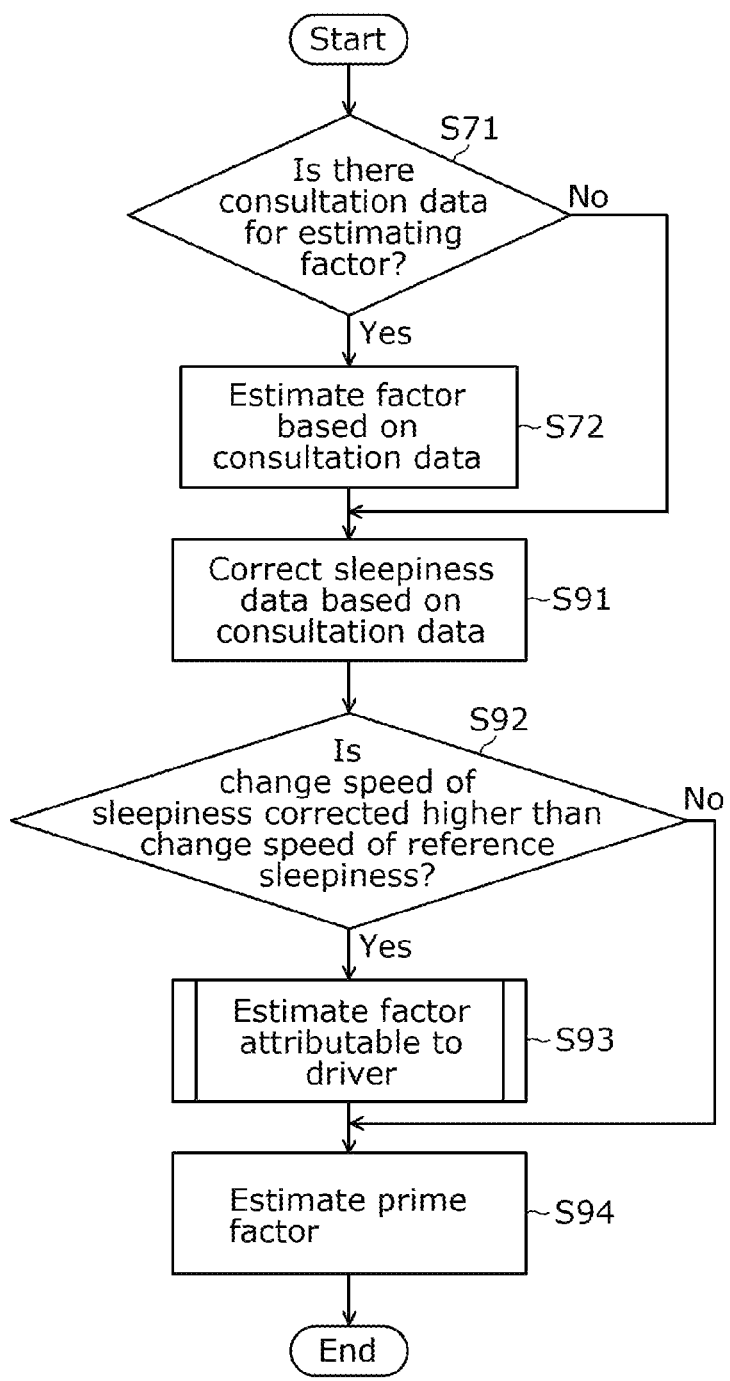
FIG. 13 is a flowchart illustrating another example of the operation in step S7 in FIG. 4.

FIG. 13 is a flowchart illustrating an example of another operation in step S7 in FIG. 4.

As illustrated in FIG. 13, when estimating a factor based on the consultation data (step S72), factor estimator 20 corrects the sleepiness data based on the consultation data (step S91). For example, for sleepiness data obtained in a pollen month, factor estimator 20 corrects the sleepiness data in such a manner as to reduce a change speed of sleepiness.

Factor estimator 20 determines whether the change speed of sleepiness corrected is higher than the change speed of the reference sleepiness (step S92). The change speed of sleepiness corrected is a change speed of sleepiness indicated by the sleepiness data corrected in step S91.

When the change speed of sleepiness corrected is higher than the change speed of the reference sleepiness (Yes in step S92), factor estimator 20 estimates a factor attributable to the driver (step S93). For example, the factor attributable to the driver is an example of the internal factor.

When the change speed of sleepiness corrected is not higher than the change speed of the reference sleepiness (No in step S92) or when the factor attributable to the driver is estimated (step S93), factor estimator 20 estimates a prime factor (step S94). For example, when the sleepiness data was obtained in a pollen month, and when the change speed of sleepiness corrected that is indicated by the sleepiness data corrected in such a manner as to reduce the change speed of sleepiness is not higher than the change speed of the reference sleepiness, factor estimator 20 estimates that taking medicine for pollinosis is the prime factor. For example, when estimating the factor attributable to the driver, factor estimator 20 estimates the factor attributable to the driver as the prime factor.

Figure 14:
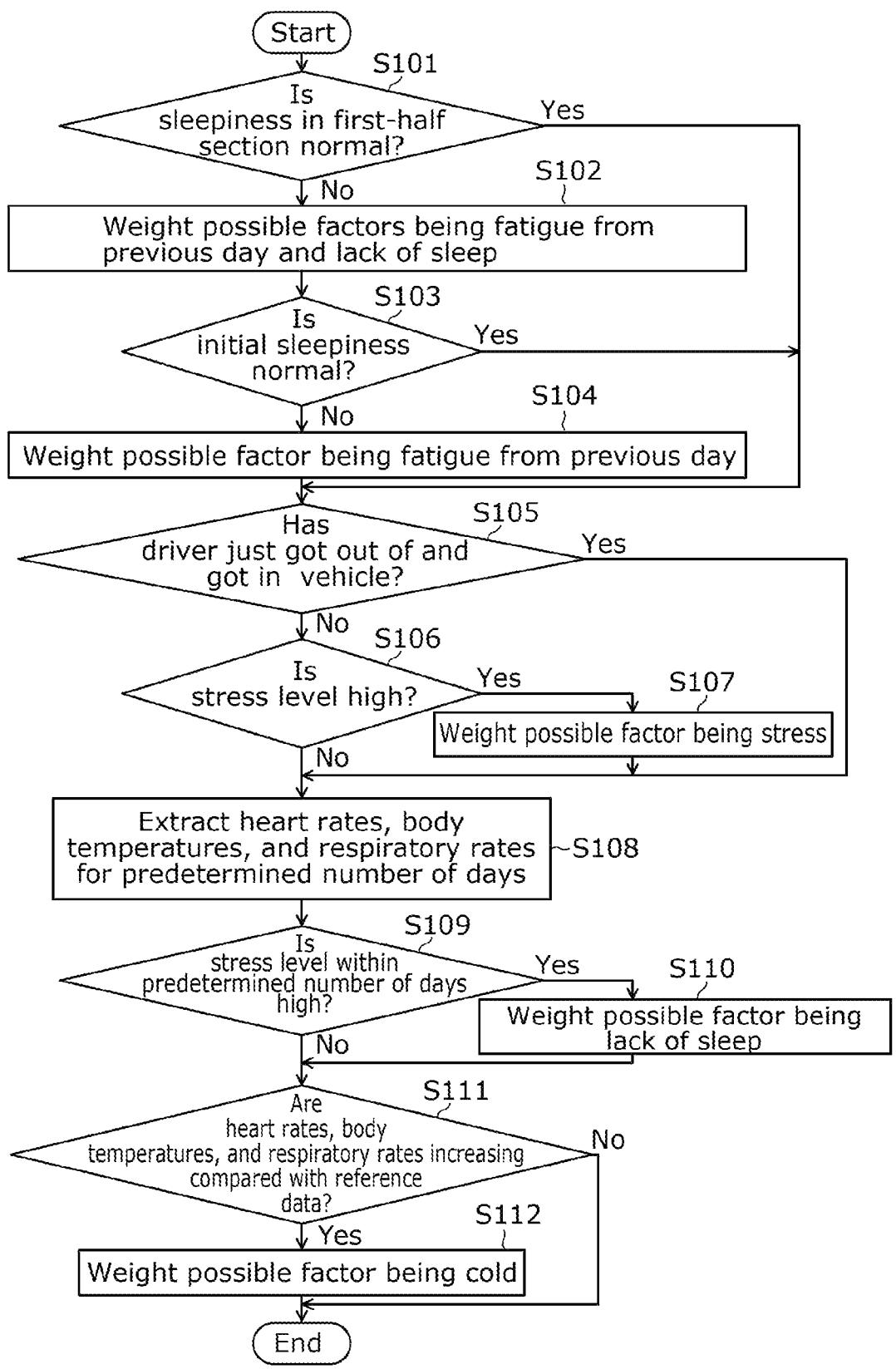
FIG. 14 is a flowchart illustrating an example of operation in step S93 in FIG. 13.

FIG. 14 is a flowchart illustrating an example of operation in step S93 in FIG. 13.

As illustrated in FIG. 14, factor estimator 20 determines whether sleepiness in a first-half section is normal (step S101). The first-half section is a first half of a section of the route from the drive starting point to the current point of vehicle 100. For example, factor estimator 20 determines whether the sleepiness in the first-half section is normal, based on the sleepiness data and the reference data.

When the sleepiness in the first-half section is not normal (No in step S101), factor estimator 20 weights a possible factor being fatigue from a previous day and a possible factor being lack of sleep (step S102).

Factor estimator 20 determines whether the initial sleepiness is normal (step S103). For example, factor estimator 20 determines whether the sleepiness at the drive starting point is greater than the reference sleepiness by the threshold value or more based on the sleepiness data and the reference data. When the sleepiness at the drive starting point is not greater than the reference sleepiness by the threshold value or more, factor estimator 20 determines that the initial sleepiness is normal, and when the sleepiness at the drive starting point is greater than the reference sleepiness by the threshold value or more, factor estimator 20 determines that the initial sleepiness is not normal.

When the initial sleepiness is not normal (No in step S103), factor estimator 20 weights a possible factor being fatigue from a previous day (step S104).

When the sleepiness in the first-half section is normal (Yes in step S101), when the initial sleepiness is normal (Yes in step S103), or when the possible factor being fatigue from a previous day is weighted (step S104), factor estimator 20 determines whether the driver has just got out of and got into the vehicle (step S105). For example, when determining that a driver's side door of vehicle 100 has been closed and opened twice from opening-closing records of the driver's side door, factor estimator 20 determines that the driver has got out of and got into the vehicle. For example, in the case where the driver got out of and got into the vehicle within a predetermined time period before the current time point, factor estimator 20 determines that the driver has just got out of and got into the vehicle.

In the case where the driver has not just got out of and got into the vehicle (No in step S105), factor estimator 20 determines whether a stress level of the driver is high (step S106). Specifically, factor estimator 20 determines whether the stress level of the driver is higher than a threshold value. For example, factor estimator 20 calculates the stress level of the driver based on biological information on the driver. For example, the biological information includes a heart rate, a body temperature, a respiratory rate, etc.

When the stress level of the driver is high (Yes in step S106), factor estimator 20 weights a possible factor being stress (step S107).

In the case where the driver has just got out of and got into the vehicle (Yes in step S105), when the stress level of the driver is not high (No in step S106), or when the possible factor being stress is weighted (step S107), factor estimator 20 extracts heart rates, body temperatures, and respiratory rates for a predetermined number of days (step S108). For example, factor estimator 20 extracts the heart rates, body temperatures, and respiratory rates from the biological information.

Factor estimator 20 determines whether a stress level within the predetermined number of days is high (step S109). Here, factor estimator 20 determines whether the stress level of the driver within the predetermined number of days is higher than a threshold value that is smaller than the threshold value used in step S106. In short, the threshold value used in step S106 is higher than the threshold value used in step S109.

When the stress level within the predetermined number of days is high (Yes in step S109), factor estimator 20 weights a possible factor being lack of sleep (step S110).

When the stress level within the predetermined number of days is not high (No in step S109) or when the possible factor being lack of sleep is weighted (step S110), factor estimator 20 determines whether the heart rates, body temperatures, and respiratory rates are increasing compared with the reference data (step S111).

When the heart rates, body temperatures, and respiratory rates are increasing compared with the reference data (Yes in step S111), factor estimator 20 weights a possible factor being cold (step S112).

When the heart rates, body temperatures, and respiratory rates are not increasing compared with the reference data (No in step S111) or when the possible factor being cold is weighted (step S112), factor estimator 20 ends the processing.

Factor estimator 20 estimates a possible factor having the greatest weight as the prime factor (step S94) (see FIG. 13).

In this manner, factor estimator 20 estimates the factor, based on at least one of: a section in which determiner 18 has determined that the sleepiness of the driver is not normal; the sleepiness of the driver at the drive starting point at which the driver has started driving vehicle 100; or the biological information on the driver.

Factor estimator 20 also estimates, as the factor, an internal factor that affects sleepiness.

Figure 15:
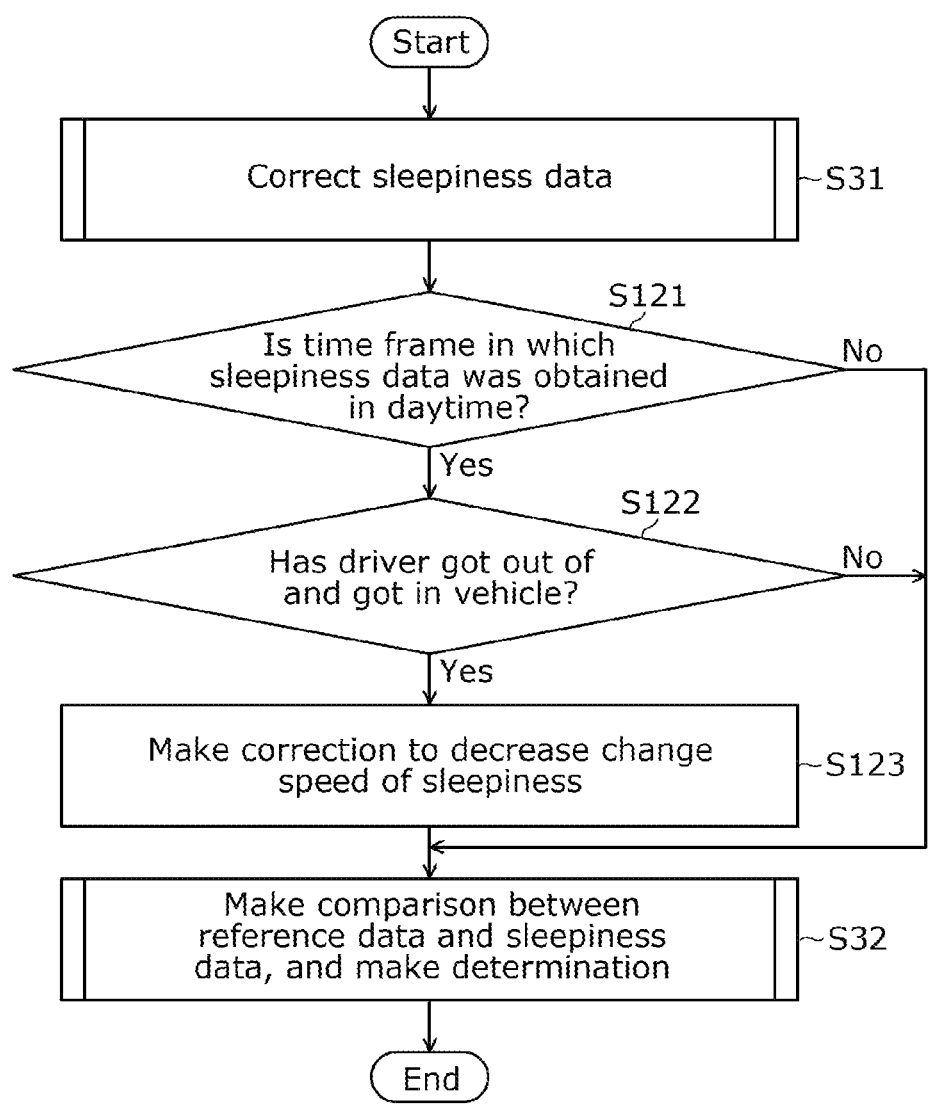
FIG. 15 is a flowchart illustrating another example of the operation in step S4 in FIG. 4.

FIG. 15 is a flowchart illustrating another example of the operation in step S4 in FIG. 4.

As illustrated in FIG. 15, when correcting the sleepiness data (step S31), determiner 18 determines whether a time frame in which the sleepiness data was obtained is in the daytime (step S121).

When the time frame in which the sleepiness data was obtained is in the daytime (Yes in step S121), determiner 18 determines whether the driver has got out of and got into the vehicle (step S122). For example, determiner 18 determines whether the driver has got out of and got into the vehicle from the opening-closing records of the driver's side door of vehicle 100.

In the case where the driver has got out of and got into the vehicle (Yes in step S122), determiner 18 determines that the driver has had lunch, and makes a correction to decrease the change speed of sleepiness (step S123). For example, determiner 18 measures the change speed of sleepiness beforehand to obtain how much the change speed of sleepiness increases by having lunch, and calculates beforehand a correction value for reducing a change in sleepiness caused by having lunch. Determiner 18 multiplies the sleepiness data by the correction value, thereby making the correction to decrease the change speed of sleepiness.

When the time frame in which the sleepiness data was obtained is not in the daytime (No in step S121), in the case where the driver has not got out of and got into the vehicle (No in step S122), or when the correction is made to decrease the change speed of sleepiness (step S123), determiner 18 makes the comparison between the reference data and the sleepiness data to make the determination (step S32).

In this manner, determiner 18 calculates the correction value that reduces the change in the sleepiness of the driver caused by the driver having lunch, corrects the sleepiness data using the correction value, and makes a comparison between the sleepiness data corrected and the reference data to determine whether the sleepiness of the driver is normal.

Determination system 10 according to the present embodiment includes determiner 18 that determines whether sleepiness of a driver who drives a mobile body (vehicle 100) is normal, based on sleepiness data regarding the sleepiness of the driver and reference data regarding sleepiness used as reference for determining whether the sleepiness of the driver is normal.

Accordingly, whether the sleepiness of the driver is normal can be determined based on the sleepiness data and the reference data.

Further, in determination system 10 according to the present embodiment, determiner 18 makes a comparison between a first change speed that is a change speed of sleepiness indicated by the sleepiness data and a second change speed that is a change speed of sleepiness indicated by the reference data, and determines that the sleepiness of the driver is not normal when the first change speed is greater than the second change speed.

Accordingly, it is possible to determine that the sleepiness of the driver is not normal when the first change speed is greater than the second change speed.

Further, in determination system 10 according to the present embodiment, determiner 18 calculates a correction value for correcting the sleepiness data.

Accordingly, whether the sleepiness of the driver is normal can be determined based on the sleepiness data corrected using the correction value and the reference data. Therefore, it is possible to determine whether the sleepiness of the driver is normal, with higher precision.

Further, in determination system 10 according to the present embodiment, determiner 18 calculates the correction value that reduces a change in the sleepiness of the driver caused by an external factor that affects sleepiness.

Accordingly, whether the sleepiness of the driver is normal can be determined based on the sleepiness data corrected in such a manner as to reduce the change in the sleepiness of the driver caused by an external factor and the reference data. Therefore, it is possible to determine whether the sleepiness is made not normal by a factor other than the external factor, with higher precision.

Further, in determination system 10 according to the present embodiment, determiner 18 calculates the correction value that reduces a change in the sleepiness of the driver caused by the driver having lunch.

Accordingly, whether the sleepiness of the driver is normal can be determined based on the sleepiness data corrected in such a manner as to reduce the change in the sleepiness of the driver caused by having lunch and the reference data. Therefore, it is possible to determine whether the sleepiness is made not normal by a factor other than having lunch, with higher precision.

Further, in determination system 10 according to the present embodiment, determiner 18 makes a comparison between first sleepiness that is indicated by the sleepiness data and is the sleepiness of the driver at a drive starting point at which the driver has started driving the mobile body (vehicle 100) and second sleepiness that is indicated by the reference data and is sleepiness of the driver in past at the drive starting point, and determines that the sleepiness of the driver is not normal when the first sleepiness is greater than the second sleepiness.

Accordingly, it is possible to determine that the sleepiness of the driver is not normal when the first sleepiness is greater than the second sleepiness.

Further, in determination system 10 according to the present embodiment, determiner 18 determines whether the sleepiness of the driver is normal, based on the sleepiness data indicating sleepiness having an increasing tendency and the reference data.

Accordingly, it is possible to determine whether the sleepiness of the driver is normal in a state where the sleepiness of the driver is increasing.

Further, determination system 10 according to the present embodiment further includes an estimator (factor estimator 20) that, when determiner 18 determines that the sleepiness of the driver is not normal, estimates a factor for the sleepiness of the driver being not normal.

Accordingly, it is possible to estimate a factor for the sleepiness of the driver being not normal.

Further, in determination system 10 according to the present embodiment, the estimator (factor estimator 20) estimates the factor, based on the sleepiness data and the reference data.

Accordingly, the factor for the sleepiness of the driver being not normal can be estimated based on the sleepiness data and the reference data. Therefore, it is possible to estimate the factor for the sleepiness of the driver being not normal, with higher precision.

Further, in determination system 10 according to the present embodiment, the estimator (factor estimator 20) estimates the factor, based on at least one of: a section in which determiner 18 has determined that the sleepiness of the driver is not normal; the sleepiness of the driver at a drive starting point at which the driver has started driving the mobile body (vehicle 100); or biological information on the driver.

Accordingly, the factor for the sleepiness of the driver being not normal can be estimated based on at least one of: the section in which determiner 18 has determined that the sleepiness of the driver is not normal; the sleepiness of the driver at the drive starting point at which the driver has started driving the mobile body (vehicle 100); or biological information on the driver. Therefore, it is possible to estimate the factor for the sleepiness of the driver being not normal, with higher precision.

Further, in determination system 10 according to the present embodiment, the estimator (factor estimator 20) estimates, as the factor, an internal factor that affects sleepiness.

Accordingly, it is possible to estimate an internal factor for the sleepiness of the driver being not normal.

Further, determination system 10 according to the present embodiment further includes controller 22 that controls a report to the mobile body (vehicle 100), based on a result of determination made by determiner 18.

Accordingly, the report to the mobile body (vehicle 100) can be controlled, based on the result of determination made by determiner 18. Therefore, it is possible for the driver of the mobile body (vehicle 100) not to receive a report in particular when the sleepiness of the driver is normal and to receive a report when the sleepiness of the driver is not normal.

Further, determination system 10 according to the present embodiment further includes generator 16 that extracts at least one past data item regarding sleepiness in past, based on a route on which the sleepiness data was obtained and a time frame in which the sleepiness data was obtained, and generates the reference data based on the at least one past data item.

Accordingly, the reference data can be generated using the at least one past data item extracted based on the route on which the sleepiness data was obtained and the time frame in which the sleepiness data was obtained. Therefore, it is possible to determine whether the sleepiness of the driver is normal, with higher precision.

Further, in determination system 10 according to the present embodiment, generator 16 extracts, as the at least one past data item, (i) a plurality of past data items that are regarding sleepiness in past and were obtained on a route identical to the route on which the sleepiness data was obtained, (ii) a plurality of past data items that are regarding sleepiness in past and were obtained on a route that overlaps the route on which the sleepiness data was obtained, or (iii) a plurality of past data items that are regarding sleepiness in past and were obtained in a predetermined section of a route which starts at a starting point identical to a starting point of the route on which the sleepiness data was obtained, the predetermined section starting at the starting point.

Accordingly, the reference data can be generated using the at least one past data item obtained on a route identical or similar to the route on which the sleepiness data was obtained. Therefore, it is possible to determine whether the sleepiness of the driver is normal, with higher precision.

OTHER EMBODIMENTS ETC.

Hereinbefore, a determination system according to one or more aspects has been described based on an embodiment, but the present disclosure is not limited to this embodiment. Various modifications of the present embodiment that may be conceived by those skilled in the art may also be included within the scope of the present disclosure as long as they do not depart from the essence of the present disclosure.

In the embodiment described above, each constituent element may be configured as dedicated hardware or may be realized by executing a software program suitable for the constituent element. Each constituent element may be realized as a result of a program executing unit, such as a central processing unit (CPU) or a processor, reading and executing the software program recorded on a recording medium such as a hard disk or a semiconductor memory. Here, the software program for realizing the device and the like according to the embodiment described above is a program that causes a computer to execute the steps included in the flowcharts illustrated in FIG. 4 through FIG. 15.

Note that the present disclosure also includes the following cases.

(1) Each of the devices described above is specifically a computer system including a microprocessor, ROM, random-access memory (RAM), a hard disk unit, a display unit, a keyboard, a mouse, etc. A computer program is stored in the RAM or hard disk unit. Each device fulfils its function as a result of the microprocessor operating according to the computer program. Here, the computer program is configured of a plurality of pieced together instruction codes indicating instructions to the computer for fulfilling predetermined functions.

(2) Some or all of the constituent elements included in the devices described above may be configured as a single system large scale integration (LSI) circuit. A system LSI is a super multifunctional LSI manufactured by integrating a plurality of units on a single chip, and is specifically a computer system including, for example, a microprocessor, ROM, and RAM. A computer program is stored in the RAM. The system LSI circuit fulfills its function as a result of the microprocessor operating according to the computer program.

(3) Some or all of the constituent elements included in the devices described above may be configured as an integrated circuit (IC) card or standalone module attachable to and detachable from the devices. The IC card or module is a computer system including, for example, a microprocessor, ROM, and RAM. The IC card or module may include the super multifunctional LSI described above. The IC card or module fulfills its function as a result of the microprocessor operating according to a computer program. The IC card or module may be tamperproof.

(4) The present disclosure may be the method described above. The present disclosure may be a computer program realizing these methods with a computer, or a digital signal of the computer program.

The present disclosure may be a computer-readable recording medium, such as a flexible disk, a hard disk, a CD-ROM, an MO, a DVD, a DVD-ROM, DVD-RAM, a Blu-ray (registered trademark) Disc (BD), and semiconductor memory having recording thereon the computer program or the digital signal. The present disclosure may also be the digital signal recorded on these recording media.

The present disclosure may transmit the computer program or the digital signal via, for example, a telecommunication line, a wireless or wired communication line, a network such as the Internet, or data broadcasting.

The present disclosure may be a computer system including a microprocessor and memory. The memory may store the computer program, and the microprocessor may operate according to the computer program.

The present disclosure may be implemented by another independent computer system by recording the program or the digital signal on the recording medium and transporting it, or by transporting the program or the digital signal via the network, etc.

(5) The above embodiments and other aspects may be combined.

Additional Remark

The following techniques are disclosed according to the description of the embodiments and the like mentioned above.

Technique 1

A determination system including:
a determiner that determines whether sleepiness of a driver who drives a mobile body is normal, based on sleepiness data regarding the sleepiness of the driver and reference data regarding sleepiness used as reference for determining whether the sleepiness of the driver is normal.

Technique 2

The determination system according to technique 1, wherein the determiner makes a comparison between a first change speed that is a change speed of sleepiness indicated by the sleepiness data and a second change speed that is a change speed of sleepiness indicated by the reference data, and determines that the sleepiness of the driver is not normal when the first change speed is greater than the second change speed.

Technique 3

The determination system according to technique 1 or 2, wherein the determiner calculates a correction value for correcting the sleepiness data.

Technique 4

The determination system according to technique 3, wherein the determiner calculates the correction value that reduces a change in the sleepiness of the driver caused by an external factor that affects sleepiness.

Technique 5

The determination system according to technique 3, wherein the determiner calculates the correction value that reduces a change in the sleepiness of the driver caused by the driver having lunch.

Technique 6

The determination system according to any one of techniques 1 to 5,
wherein the determiner makes a comparison between first sleepiness that is indicated by the sleepiness data and is the sleepiness of the driver at a drive starting point at which the driver has started driving the mobile body and second sleepiness that is indicated by the reference data and is sleepiness of the driver in past at the drive starting point, and determines that the sleepiness of the driver is not normal when the first sleepiness is greater than the second sleepiness.

Technique 7

The determination system according to any one of techniques 1 to 6,
wherein the determiner determines whether the sleepiness of the driver is normal, based on the sleepiness data indicating sleepiness having an increasing tendency and the reference data.

Technique 8

The determination system according to technique 1, further including:
an estimator that, when the determiner determines that the sleepiness of the driver is not normal, estimates a factor for the sleepiness of the driver being not normal.

Technique 9

The determination system according to technique 8, wherein the estimator estimates the factor, based on the sleepiness data and the reference data.

Technique 10

The determination system according to technique 8 or 9, wherein the estimator estimates the factor, based on at least one of: a section in which the determiner has determined that the sleepiness of the driver is not normal; the sleepiness of the driver at a drive starting point at which the driver has started driving the mobile body; or biological information on the driver.

Technique 11

The determination system according to any one of techniques 8 to 10,
wherein the estimator estimates, as the factor, an internal factor that affects sleepiness.

Technique 12

The determination system according to any one of techniques 1 to 11, further including:
a controller that controls a report to the mobile body, based on a result of determination made by the determiner.

Technique 13

The determination system according to any one of techniques 1 to 12, further including:
a generator that extracts at least one past data item regarding sleepiness in past, based on a route on which the sleepiness data was obtained and a time frame in which the sleepiness data was obtained, and generates the reference data based on the at least one past data item.

Technique 14

The determination system according to technique 13, wherein the generator extracts, as the at least one past data item, (i) a plurality of past data items that are regarding sleepiness in past and were obtained on a route identical to the route on which the sleepiness data was obtained, (ii) a plurality of past data items that are regarding sleepiness in past and were obtained on a route that overlaps the route on which the sleepiness data was obtained, or (iii) a plurality of past data items that are regarding sleepiness in past and were obtained in a predetermined section of a route which starts at a starting point identical to a starting point of the route on which the sleepiness data was obtained, the predetermined section starting at the starting point.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in its entirety: Japanese Patent Application No. 2022-170066 filed on Oct. 24, 2022.

INDUSTRIAL APPLICABILITY

The present disclosure is applicable to, for example, a system that determines whether sleepiness of a driver is normal.

The invention claimed is:

1. A determination system comprising:
a processor; and
a memory including instructions that, when executed by the processor, causes the processor to perform operations, the operations including:
obtaining current sleepiness data, sleepiness data being time-series data of a sleepiness level of a driver who drives a mobile body;
extracting at least one past data from one or more past data based on a route on which the current sleepiness data is obtained and a time frame in which the current sleepiness data is obtained, the one or more past data being sleepiness data obtained in past;
generating reference data from the at least one past data, the reference data being time-series data of the sleepiness level used as a reference for determining whether the sleepiness of the driver is normal; and
determining whether sleepiness of the driver is normal, based on the current sleepiness data and the reference data, wherein
the processor makes a comparison between a first change speed that is a change speed of sleepiness indicated by the current sleepiness data and a second change speed that is a change speed of sleepiness indicated by the reference data, and determines that the sleepiness of the driver is not normal when the first change speed is greater than the second change speed.

2. The determination system according to claim 1, wherein the processor:
determines whether there is an external factor that affects sleepiness and is not attributable to the driver in the at least one past data, based on sensor data obtained by at least one sensor and operation management data regarding operation management of the mobile body; and
when it is determined that there is the external factor, corrects the reference data in such a manner as to reduce the second change speed according to the external factor.

3. The determination system according to claim 2,
wherein the external factor includes at least one of weather, a traffic situation, a month, a date, a room temperature, humidity, atmospheric pressure, and illuminance, and
the processor corrects the reference data in such a manner as to reduce the second change speed for each of the external factor.

4. The determination system according to claim 2,
wherein when it is determined that the driver has had lunch, the processor corrects the current sleepiness data in such a manner as to reduce the first change speed by using previously measured change speed of sleepiness when the driver has had lunch.

5. The determination system according to claim 1,
wherein the processor makes a comparison between a first sleepiness level that is indicated by the current sleepiness data and is the sleepiness level of the driver at a drive starting point at which the driver has started driving the mobile body and a second sleepiness level that is indicated by the reference data and is sleepiness level of the driver at the drive starting point in past, and determines that the sleepiness of the driver is not normal when the first sleepiness level is greater than the second sleepiness level.

6. The determination system according to claim 1,
wherein the processor determines whether the sleepiness of the driver is normal, based on the current sleepiness data indicating sleepiness having an increasing tendency and the reference data.

7. The determination system according to claim 1, wherein
when it is determined that the sleepiness of the driver is not normal, the processor estimates a factor for the sleepiness of the driver being not normal.

8. The determination system according to claim 7,
wherein the processor estimates the factor, based on the current sleepiness data and the reference data.

9. The determination system according to claim 7,
wherein the processor estimates the factor, based on at least one of: a section in which the processor has determined that the sleepiness of the driver is not normal; the sleepiness level of the driver at a drive starting point at which the driver has started driving the mobile body; or biological information on the driver.

10. The determination system according to claim 7,
wherein the processor estimates, as the factor, an internal factor that affects sleepiness.

11. The determination system according to claim 1, wherein
the processor further controls a report to the mobile body, based on a result of determination of whether sleepiness of the driver is normal.

12. The determination system according to claim 1,
wherein the processor extracts, as the at least one past data, (i) a plurality of past data that were obtained on a route identical to the route on which the current sleepiness data was obtained, (ii) a plurality of past data that were obtained on a route that overlaps the route on which the current sleepiness data was obtained, or (iii) a plurality of past data that were obtained in a predetermined section of a route which starts at a starting point identical to a starting point of the route on which the current sleepiness data was obtained, the predetermined section starting at the starting point.

13. The determination system according to claim 9,
wherein the biological information is any one of a heart rate, a body temperature, or a respiratory rate of the driver.

14. The determination system according to claim 10,
wherein the internal factor is any one of taking medicine, lack of sleep, or fatigue from a previous day.

15. The determination system according to claim 1,
wherein the sleepiness level is an index indicating a magnitude of sleepiness.

16. The determination system according to claim 1, wherein the mobile body is a vehicle.

17. The determination system according to claim 10,
wherein the processor estimates fatigue from a previous day or lack of sleep is the internal factor when the sleepiness in a first-half section is not normal and the sleepiness level at a drive starting point at which the driver has started driving the mobile body is higher than the sleepiness level of reference data by a threshold value, the first-half section being a first half of a section of the route from the drive starting point to a current point of the mobile body.

18. The determination system according to claim 10, wherein the processor estimates that a physical condition is the internal factor when a heart rate, a body temperature, and a respiratory rate are increasing compared with the reference data.

* * * * *